United States Patent [19]
Chiba et al.

[11] Patent Number: 5,571,595
[45] Date of Patent: Nov. 5, 1996

[54] MAGNETIC RECORDING MEDIUM AND METHOD FOR PRODUCTION THEREOF

[75] Inventors: Kazunobu Chiba; Kenichi Sato; Yuichi Arisaka; Hirofumi Kondo; Yukari Yamada, all of Miyagi, Japan

[73] Assignee: Sony Corporation, Tokyo, Japan

[21] Appl. No.: 90,197

[22] PCT Filed: Nov. 18, 1992

[86] PCT No.: PCT/JP92/01510

§ 371 Date: Nov. 26, 1993

§ 102(e) Date: Nov. 26, 1993

[87] PCT Pub. No.: WO93/10526

PCT Pub. Date: May 27, 1993

[30] Foreign Application Priority Data

Nov. 18, 1991 [JP] Japan .................. 3-302009
Dec. 26, 1991 [JP] Japan .................. 3-356779
Jan. 31, 1992 [JP] Japan .................. 4-041962

[51] Int. Cl.$^6$ .............. G11B 5/66; B32B 3/10; C23C 14/00
[52] U.S. Cl. .............. 428/141; 428/694 T; 428/694 TP; 428/694 TC; 428/694 TF; 428/694 TR; 428/336; 428/408; 428/473.5; 428/474.4; 428/480; 428/698; 428/699; 428/702; 428/704; 428/900; 427/131; 427/132; 427/585; 204/192.2; 204/192.35
[58] Field of Search .............. 428/694 T, 694 TP, 428/694 TC, 694 TF, 694 TR, 141, 702, 900, 336, 408, 473.5, 474.4, 480, 698, 699, 704; 427/41, 131, 132; 204/192.2, 192.35

[56] References Cited

U.S. PATENT DOCUMENTS 4,565,734  1/1986  Arai ...................... 428/216
4,889,767  12/1989  Yokoyama ............... 428/336

FOREIGN PATENT DOCUMENTS 58-222439  12/1983  Japan .
62-146480  6/1987  Japan .
1-112528  5/1989  Japan .

*Primary Examiner*—Leszek Kiliman
*Attorney, Agent, or Firm*—Hill, Steadman & Simpson

[57] ABSTRACT

A magnetic recording medium having a magnetic metal thin film as a magnetic layer is disclosed. An oxide layer is formed on the surface of the magnetic metal thin film, and a proactive layer is further formed on the oxide layer. The oxide layer on the surface of the magnetic metal thin film has a thickness of 20 to 230 Å, while the protective layer has a thickness of 20 to 230 Å. The combined total thickness of the oxide layer and the protective layer is 40 to 250 Å. The oxide layer surface may be bombarded prior to formation of the protective layer for improving the bonding of the protective layer. A lubricant may be coated on the surface of the protective layer. The lubricant may be one of perfluoro alkyl ester of carboxylic acid, ester compounds of perfluoro polyether having carboxylic groups, and amine salt compounds. The reverse surface of a non-magnetic base film as a substrate has a centerline mean roughness $R_a$ and the maximum height $R_{max}$ of projections in the ranges of $0.015 \: \mu m \leq R_a \: 0.0070 \: \mu m$ and $0.015 \leq R_{max} \leq 0.070 \: \mu m$, respectively.

13 Claims, 18 Drawing Sheets

5,571,595

MAGNETIC RECORDING MEDIUM AND METHOD FOR PRODUCTION THEREOF

TECHNICAL FIELD

This invention relates to a magnetic recording medium, above all, an evaporated tape on which a thin metal film is deposited by evaporation, and a method for producing the recording medium.

BACKGROUND ART

A magnetic recording medium of a so-called magnetic metal thin film type, in which a magnetic material of metal or an alloy such as Co—Ni is directly deposited by plating or a vacuum thin film forming technique (e.g. vacuum deposition, sputtering or Ion plating) on a base film, such as a polyester film or a polyimide film, has a number of advantages, that is, it is superior in coercivity, rectangular ratio or in electromagnetic transducing characteristics for a short wavelength range, while the magnetic layer can be reduced in thickness for reducing demagnetization due to recording or thickness losses during playback. In addition, the packing density of the magnetic material may be increased because there is no necessity of mixing a non-magnetic binder into the magnetic layer.

In the magnetic metal thin film type recording medium, the magnetic layer is generally formed by vacuum deposition. For example, the magnetic layer is deposited by a so-called continuous take-up type oblique evaporation method in which an evaporated magnetic material is deposited on the base film which is caused to run in a vacuum chamber from a supply side to a take-up side so as to travel on the outer peripheral surface of a cooling can provided on the travel path of the base film.

Meanwhile, when the magnetic metal thin film type magnetic recording medium is employed in, above all, a digital video tape recorder, since the data transfer rate is extremely high, the relative velocity between the magnetic recording medium and the magnetic head during recording and playback needs to be at least twice the recording velocity for conventional analog recording. Since a considerable damage is done in this manner to the magnetic recording medium, it has become crucial to improve durability of the magnetic recording medium.

However, if oxygen be introduced during vacuum deposition for providing a protective layer, such as a Co oxide, on the surface of the magnetic layer, sufficient durability of the magnetic recording medium cannot be achieved. For this reason, it becomes additionally necessary to provide a protective film of an abrasion-resistant material. Besides, if simply the protective film is increased in thickness, there is a risk that electro-magnetic transducing characteristics be deteriorated due to spacing losses.

In view of the above-described status of the art, at is an object of the present invention to provide a magnetic recording medium which is improved in abrasion resistance without incurring deterioration of the electromagnetic transducing characteristics and which is superior in durability and reliability, and a method for producing such magnetic recording medium.

DISCLOSURE OF THE INVENTION

In its one aspect, the present invention provides magnetic recording medium in which, as shown in an enlarged schematic cross-sectional view of FIG. 1, a metal magnetic thin film 102, a layer 103 of an oxide of the metal magnetic thin film 102 and a protective layer 104 are sequentially formed on a substrate (base film) 101, the oxide layer 103 and the protective layer 104 having thicknesses $t_1$ and $t_2$ of 20 to 230 Å and 20 to 230 Å, respectively, with the combined thickness T of the oxide layer 103 and the protective layer 104 being 40 to 250 Å.

In another aspect of the present invention, the protective layer 4 of the magnetic recording medium is formed of an inorganic material.

During deposition of the protective layer, the surface of the oxide layer may be previously bombarded for improving contact tightness of the protective film.

That is, after the magnetic metal thin film is formed on the base film within a vacuum chamber by vacuum deposition, the as-deposited magnetic metal thin film may be bombarded at a making power density of 1.6 kW/m² or higher, and a protective film may then be formed continuously on the bombarded magnetic metal thin film within the same vacuum chamber. This is the second subject-matter of the present invention.

The magnetic metal thin film, which is to be a magnetic layer, is formed by a vacuum deposition method. The vacuum deposition method includes not only the usual vacuum deposition method, but also a method in which evaporated chemical species are ionized and accelerated under the action of an electrical field, magnetic field or electron beam irradiation for allowing the magnetic thin film to be deposited on the base film in an atmosphere providing a longer mean free path for the evaporated chemical species.

For depositing the magnetic metal thin film by the above-described vacuum deposition method, the so-called oblique vacuum deposition method is utilized in which a magnetic material evaporated from a source of the material is incident and deposited from a predetermined inclined incident direction on the surface of a non-magnetic base material travelling along the outer periphery of a cooling can which is adapted for being rotated in a predetermined rotational direction. An oxygen gas is introduced onto the surface of the non-magnetic base material for improving durability and magnetic properties of the magnetic metal thin film.

After deposition of the magnetic metal thin film by the vacuum deposition method, the above-mentioned bombardment operation is carried out. This assures a sufficient bonding power between the magnetic metal thin film and the protective film for improving durability and reliability even if the protective film is deposited on the magnetic metal thin film. On the other hand, spacing losses may be minimized and the electromagnetic transducing characteristics may be improved.

The gas used for bombardment is preferably an inert gas, specifically an Ar gas, for avoiding oxidation of the surface of the magnetic metal thin film.

For bombardment, the making power density at a pair of electrodes provided within a bombardment device is to be 1.6 kW/m² or higher. If the making power density is lower than 1.6 kW/m², sufficient etching effects on the film surface cannot be expected such that the bonding power of the protective film cannot be improved. The making power density represents the processing capacity per unit area. It is desirable to set the voltage and current applied to the electrodes in dependence upon the tape speed or tape width of the base film in order for the making power density to be within the above-mentioned range.

After the above-mentioned bombardment, the protective film is deposited on the bombarded surface within the same vacuum chamber. This assures a sufficient bonding power of the protective film to prevent the protective film from becoming delaminated during sliding contact of the magnetic head to improve durability and reliability.

There is no particular limitation to the method of film deposition and any of sputtering, CVD and vacuum deposition may be employed. However, such a method which permits in-line processing and a magnetic metal thin film depositing process is most preferred.

A carbon film is generally preferred for the protective film. However, any of an $SiO_2$, $Si_3N_4$, $SiN_x$, BN, $ZnO_2$, $Al_2O_3$, $MoS_2$ or SiC film, which is formed by sputtering, may also be employed.

Also, any of customarily employed magnetic materials may be employed as a material constituting the magnetic metal thin film. However, a magnetic metal material is preferred. Any of magnetic metal materials commonly employed with this type of the magnetic recording medium may be employed. Examples of these materials include magnetic metal materials, such as Fe, Co or Ni, Fe—Co, Co—Ni, Fe—Co—Ni, Fe—Co—Cr, Co—Ni—Cr and Fe—Co—Ni—Cr.

The magnetic metal thin film is deposited by a vacuum thin film forming technique. Examples of the vacuum thin film forming technique include vacuum deposition, sputtering and ion plating. Of these, vacuum deposition is most preferred. Besides the usual vacuum deposition process, vacuum deposition may be carried out in such a manner that a vaporized stream is ionized and accelerated under the effects of an electrical field or a magnetic field or by electron beam radiation for establishing an atmosphere assuring an increased mean free path for chemical species being evaporated for allowing deposition of a thin film on a non-magnetic base material. Typically, an oblique deposition is achieved by utilizing the vacuum thin film forming technique. By the oblique deposition is meant a method of introducing a vaporized stream of the magnetic metal material in a direction of forming a predetermined incident angle with respect to a normal line drawn to the non-magnetic base material for allowing precipitation of the magnetic thin film on the non-magnetic base material.

The magnetic metal thin film may be formed as a single layer or as a multi-layer. In the latter case, the magnetic metal thin film may be constituted by two or more stacked layers of the magnetic metal thin films and a non-magnetic intermediate layer interposed between these thin films. The sole non-magnetic intermediate layer is provided if there are two of the magnetic metal thin films, while (n–1) non-magnetic intermediate layers are provided if there are n magnetic metal thin films, n being an integer of 3 or more. The non-metallic intermediate layer(s) are effective to prevent magnetic interaction between the magnetic metal thin films for assuring a low noise.

The non-magnetic intermediate layer is formed of an oxide, such as oxides of Cr, Si, Al, Mn, Bi, Ti, Sn, Pb, In, Zn or Cu, or composite oxides thereof. The combined thickness of the non-magnetic intermediate layers is to be not more than 20% of the total thickness of the recording layer. If the combined thickness exceeds 20% of the total thickness, it becomes difficult to improve electromagnetic transducing characteristics especially for the short wavelength range. Besides, the thickness of each layer is preferably not more than 300 Å. If the thickness exceeds 300 Å, it tends to be difficult to detect recording signals from the magnetic metal thin film underlying the non-magnetic intermediate layer.

The intermediate oxide layer interposed between the magnetic metal thin films leads to a weakened magnetic bondage between the magnetic thin films. However, in case of an excessive film thickness of the oxide layer, the energy product tends to be lowered to deteriorate electro-magnetic transducing characteristics.

On the other hand, an oxide layer formed on the surface of the magnetic layer constituted by plural magnetic metal thin films, that is on the surface of the uppermost magnetic thin film, is effective to improve durability of the magnetic recording medium. However, the spacing losses tend to be produced if the oxide layer is increased in thickness. Therefore, it is crucial with the magnetic recording medium having such multi-layer structure to maintain a balance between durability and electro-magnetic characteristics.

Thus, in stacking the magnetic metal thin films, the surface of the underlying magnetic metal thin film(s) may be bombarded with an inert gas containing reducing gases.

If the surface of the magnetic metal thin film is bombarded with the inert gas containing reducing gases during vapor deposition, it becomes possible to eliminate or reduce the thickness of the intermediate oxide layer(s).

In effect, an extremely thin thickness of the intermediate oxide layer(s) on the order of tens of ≈ suffices. For example, if the oxide layer formed to a thickness of the order of 100 Å during vapor deposition is reduced in thickness to the order of 20 Å by bombardment, the residual magnetic flux density $B_r$ of the magnetic layer may be improved, while the electro-magnetic conversion characteristics may also be improved because the magnetic flux emanated from the lower magnetic thin film(s) may be prevented from being lowered.

Although there is no particular limitation to the inert gas employed for bombardment, an Ar gas, for example, is commonly employed.

The reducing gas(es) introduced into the inert gas may for example be $H_2$ gases or acetylene.

The conditions for bombardment may be represented using a constant K as defined by the following equation (1):

$$K = \frac{E \times I}{v \times w} \quad (1)$$

where E and I denote the voltage applied to the electrodes in the processing unit and the current through the electrodes, respectively. Besides, v and w in the formula (1) denote the tape speed through the processing unit and the processing width of the magnetic tape during bombardment.

Thus the above constant K may be thought of as denoting the processing capability per unit area. According to the present invention, the voltage V and the current I of the electrodes are preferably selected so that the value of K of not less than 10 is achieved. If the value of K is controlled to be within the above-mentioned range, it becomes possible to maintain durability and to improve electro-magnetic transducing characteristics of the magnetic recording medium.

Meanwhile, with the present magnetic recording medium, the magnetic layer may be of a dual-film structure or a multi-film structure composed of three or more magnetic thin films. In any case, the magnetic thin films making up the magnetic layer may be deposited so that the direction of growth is in the same direction or forward direction or in the opposite direction or reverse direction.

As the base film, any of those films customarily used with this type of the magnetic recording medium may be employed. Specific examples of these films include films formed of polyesters, such as polyethylene terephthalate or polyethylene-2, 6-naphthalate, aromatic polyamide films or polyimide resin films.

Meanwhile, when forming a multi-layered magnetic layer as described above, since the magnetic metal thin film of a reduced film thickness is to be formed by increasing the travelling speed of a flexible base material (base film) along the outer peripheral surface of the cooling can, the contact time between the travelling surface of the base film and the outer peripheral surface of the cooling can is decreased so that sufficient cooling of the base film is not achieved on the cooling can to produce the problem of heat deterioration. As a result of our eager searches, the present inventors have found that the above inconvenience may be overcome by controlling the roughness of the non-vapor-deposition surface, that is the travelling surface, of the flexible base film, for controlling the contact area between the traveling surface of the flexible base film and the outer peripheral surface of the cooling can.

Consequently, according to the third aspect of the present invention, there is provided a magnetic recording medium having plural magnetic metal thin films deposited on one of the surfaces of the flexible base film, in which the roughness of the other surface, that is the travelling surface, of the flexible base film, is defined so that the mean roughness of the centerline $R_a$ and the maximum height $R_{max}$ of the protrusions thereof are in the ranges of from $0.0015 \leq R_a \leq 0.0070$ μm and $0.015 \leq R_{max} \leq 0.070$ μm, respectively, for preventing thermal deterioration and decrease in product yield and improving the electro-magnetic transducing characteristics of the magnetic recording medium. Meanwhile, the definitions of the mean roughness of the centerline $R_a$ and the maximum height of the protrusions $R_{max}$ are given in JIS B0601.

The surface of the flexible base film, on which the magnetic layer is formed, exhibits satisfactory magnetic characteristics and surface roughness sufficient to inhibit spacing losses, whereas the opposite surface (travelling surface) thereof assures travelling characteristics and exhibits sufficient surface roughnesses to achieve a contact area with the cooling can enough to achieve the cooling of the flexible base film.

According to the present invention, the roughness of the travelling surface is defined in terms of the mean centerline roughness $R_a$ and maximum height of the projection $R_{max}$ such that $0.0015 \leq R_a \leq 0.0070$ μm, preferably $R_a \leq 0.004$ μm, and $0.015 \leq R_{max} \leq 0.070$ μm.

If the centerline mean roughness $R_a$ is less than the above prescribed value, the travelling speed of the flexible base film on the outer peripheral surface of the cooling can cannot be increased sufficiently because of the tight contact between the travelling surface and the outer peripheral surface of the cooling can. On the other hand, the flexible base film tends to be creased to render the production of a product difficult. If the centerline mean roughness $R_a$ is larger than the above prescribed value, the flexible base film travelling on the cooling can cannot be cooled sufficiently because of the excessively reduced contact area between the travelling surface of the base film and the outer peripheral surface of the cooling can. The result is the deformation of the flexible base film, such as widthwise contraction or longitudinal elongation of the base film, under the thermal effects (thermal deterioration) and lowered electro-magnetic transducing characteristics. In extreme cases, there are produced streaks in the longitudinal direction also render the product unusable 1so lower the production yield.

By defining the range of the maximum height $R_{max}$ of the protrusions, it becomes possible to average the size of the protrusions of the travelling surface. For example, if the centerline mean roughness $R_a$ is within a prescribed range, and the maximum height $R_{max}$ of the protrusions is lesser than the prescribed range, suitable roughness cannot be accorded to the travelling surface of the flexible base film, such that the travelling speed cannot be increased sufficiently. On the other hand, if the centerline mean roughness $R_a$ is within a prescribed range, and the maximum height $R_{max}$ of the protrusions is larger than the prescribed range, the protrusions are distributed on the travelling surface of the flexible base film, such that not only the flexible base film travelling on the cooling can may not be cooled sufficiently, but also the running performance of the recording medium is lowered.

The roughness of the travelling surface of the flexible base film may be controlled by adding a filler into the base film material. The filler is composed of extremely fine particles which are thought to be coalesced on addition into the base film material. Therefore, it suffices if the filler having a predetermined particle size capable of forming the protrusions within the above-prescribed size range is added into the base film material. There is no particular limitation to the types of the filler if it is such a filler as is commonly employed for this type of the magnetic recording medium.

Besides, in the present invention, the step of forming an undercoat layer, a back-coat layer or a top coat layer on the base film may be added, if so desired. There is no particular limitation to the conditions of forming the undercoat layer, back-coat layer or the top coat layer if the forming steps are those commonly employed for this type of the magnetic recording medium. Meanwhile, the undercoat layer, back-coat layer or the top coat is preferably formed in an in-line relation with respect to the step of depositing the magnetic layer and the protective layer because the productivity may be improved in this manner significantly.

The top coat layer may be formed by applying one of a variety of customary lubricants. Most preferred of the lubricants are an ester of perfluoroalkyl carboxylic acid, an ester of a perfluoro-polyether having a terminal carboxyl group and a long-chain alcohol, and amine salts of perfluoropolyethers having terminal carboxylic groups.

The ester of a perfluoroalkyl carboxylic acid is a compound represented by the general formula $RCOO(CH)_jC_kF_{2k+1}$, where R is a hydrocarbon residue, $j \geq 0$ and $k > 4$. The hydrocarbon residue R of carboxylic acid may be straight-chained or branched, saturated or unsaturated, and may, for example, be an aryl group or a perfluoro hydrocarbon residue.

The perfluoroalkyl carboxylic acid ester may be easily synthesized by a reaction of an acid chloride and a fluorine-containing alcohol.

The acid chloride may easily be synthesized by chlorinating commercial aliphatic carboxylic acid with phosphorus pentachloride $PCl_5$ or thionyl chloride $SOCl_2$. If aliphatic carboxylic acid has a smaller number of carbon atoms, the acid chloride may be synthesized by chlorination with thionyl chloride $SOCl_2$.

Fluorine-containing alcohol $C_kF_{2k+1}(CH_2)_jOH$ may easily be synthesized by chlorination of perfluoro carboxylic acid, produced by e.g. the Simmonds method, in the presence of dimethyl formamide (DMF) followed by reduction with a reducing agent. Alternatively, commercialized perfluoro alcohol represented by the general formula $C_kF_{2k+1}CH_2CH_2OH$ may be employed.

For bonding the lubricant layer containing the ester of perfluoroalkyl carboxylic acid to the magnetic metal thin film, a solution obtained by dissolving the lubricant in a solvent may be coated or sprayed on the surface of the magnetic metal thin film. Alternatively, the magnetic metal thin film may be immersed in the solution.

The coating quantity is preferably in a range of from 0.5 mg/m$^2$ to 100 mg/m$^2$ and more preferably 1 mg/m$^2$ to 20 mg/m$^2$. If the coating quantity is too small, the desirable effects of low frictional coefficients and improved abrasion resistance or durability are not displayed. Conversely, if the quantity is excessive, a phenomenon of agglutination tends to be incurred between the sliding member and the magnetic metal thin film to lower the running characteristics.

The ester compounds of perfluoro polyether having terminal carboxylic acid and long-chain alcohol are represented by the formulas: $R_f$COOR and RCOOCR$_f$COOR, where $R_f$ and R are a perfluoro polyether group and a long-chain hydrocarbon, respectively.

In addition to the ester compounds, ester phosphate or ester phosphite represented by the following formulas may be contained in the lubricants: $(R_1O)_nP(OH)_{3-n}$, $(R_1O)_nPO(OH)_{3-n}$, $(R_1S)_nP(OH)_{3-n}$ or $(R_1S)_nPO(OH)_{3-n}$, where $R_1$ is a hydrocarbon residue.

Alternatively, the long-chain alkyl amine represented by the general formula: $R_2$—NH$_2$, where $R_2$ in a long-chain hydrocarbon, may be contained in the lubricant in addition to the above-mentioned ester compound.

It is noted that the alkyl amine is to be added in an amount of 0.01 to 100, in terms of a molar ratio, with respect to the ester compound.

By the above-mentioned ester compound, coated on the surface of the thin-film magnetic recording medium, the magnetic recording medium may be of sufficient durability even when employed under hostile low-temperature low-humidity environments. Besides, the magnetic recording medium is not lowered in characteristics. In addition, Freon-based solvents may be eliminated by employing the long chain hydrocarbon-perfluoro polyether ester compounds.

These ester compounds may easily be synthesized by reacting perfluoro polyether having terminal carboxylic groups and the long-chain alcohol in anhydrous toluene under heating and refluxing using a minor amount of p-toluene sulfonic acid and concentrated sulfuric acid as catalysts under elimination of water. After completion of the reaction and removal of toluene, the resulting product is purified in a column.

The long-chain alkyl groups, as the ester compounds between perfluoro polyether having a terminal carboxylic group and the long-chain alcohol, may be selected without regard to the molecular weight, presence or non-presence of branched structure, unsaturated structure, isomeric structure, or alicyclic structure. The number of carbon atoms is preferably 6 or more in view of solubility. Table 1 shows the structure of the long-chain alkyl group. The structure of perfluoro polyether, having terminal carboxylic groups, is shown below only by way of illustration.

The substituents as phosphates or phosphites may also be selected without regard to the molecular weight, number of carbon atoms, presence or non-presence of branched structure, unsaturated structure, aromatic rings, isomers or alicyclic structure. The number of the ester substituents may be 1 to 3, whichever is possible. Although there is no particular limitation, the amount of addition of phosphates and phosphites is preferably 30 to 70 wt % of the ester compounds.

The alkyl groups as long-chained alkyl amines may similarly be selected without regard to the molecular weight, number of carbon atoms, branched structure, unsaturated structure, presence or non-presence of aromatic rings, isomers or alicyclic structure. The straight-chained hydrocarbons having 10 or more carbon atoms are preferred in view of the frictional coefficients. The amount of addition of the long-chain alkyl amine is preferably 0.01 to 10, in terms of molar ratio, with respect to the ester compounds.

A monofunctional perfluoro polyether may be exemplified by $F(CF_2CF_2CF_2O)_n$ $CF_2CF_2COOH$, $CF_3[OCF(CF_3)(CF_2)_m(OCF_2)COOH$, while a polyfunctional perfluoro polyether may be exemplified by $HOOCCF_2(OC_2F_4)_p$ $(OCF_2)_p$ $OCF_2COOH$.

In the above structural formulas of the perfluoro polyethers, l, m and n each indicate an integer of 1 or more. The molecular weight of perfluoro polyether, to which no limitation is imposed, preferably 600 to 5,000. If the molecular weight is excessive, the effect of the terminal groups is diminished, while the perfluoro polyether fraction is increased, so that the consumption of Freon is increased. Conversely, if the molecular weight is too low, the effect of the perfluoro polyether groups is decreased. As for alcohol, the number of carbon atoms of at least one of the alkyl groups thereof is preferably 6 or more.

In order for the ester compound of the perfluoro polyether having the terminal carboxylic group and the long-chain alcohol to be retained by the metal thin film type magnetic recording medium, it may be contemplated to apply the lubricant layer as a top coat on the surface of the magnetic metal thin film or on the surface of the protective film as in the case of the perfluoroalkyl carboxylic acid ester described previously. The coating quantity of the ester compound of the perfluoro polyether having the terminal carboxylic group and the long-chain alcohol is preferably 0.5 to 100 mg/m$^2$ and more preferably 1 to 20 mg/m$^2$.

If solely the carbon film is deposited on the surface of the magnetic layer, the resulting magnetic recording medium may be improved significantly in durability, even although the carbon film is of an extremely thin film thickness. However, it is not possible to prevent output characteristics after repeated running from being deteriorated. The present invention is characterized by employing not only the carbon film, but also the perfluoro polyether derivative as the lubricant. By he interaction between the carbon film and the perfluoro polyether derivative, the recording medium may be improved in running performance and in durability under a variety of operating conditions.

The above-mentioned perfluoro polyether compound is a new compound exhibiting superior and long-lasting lubricating properties as compared to those of conventional lubricant compounds. Besides, the perfluoro polyether derivative exhibits superior lubricating properties when used under hostile environments of low temperature and low humidity or, conversely, high temperature and high humidity, such that the compound is highly useful as the lubricant. Therefore, by employing the perfluoro polyether derivative as a lubricant for the magnetic recording medium, the frictional coefficient of the recording medium may be lowered due to excellent lubricating effects to improve the running performance, abrasion resistance and durability of the recording medium significantly. Besides, the perfluoro polyether derivative is highly advantageous in manufacture because it may be dissolved in solvents other than Freon, such as ethanol.

The perfluoro polyether derivative is a compound of an amine with perfluoro polyether having a terminal carboxylic group(s).

The perfluoro polyethers having a terminal carboxylic group(s) may be employed without regard to the position of substitution by the carboxylic groups (COOH). That is, the perfluoro polyethers having carboxylic groups (COOH) at both terminal ends or at least one terminal end, may be employed.

The compound of an amine and a perfluoro polyether having carboxylic groups at both terminals, referred to herein as polyfunctional perfluoro polyether, is represented by the following chemical formula 3. On the other hand, the compound of an amine and a perfluoro polyether having a carboxylic group at one of the terminals referred to herein as monofunctional perfluoro polyether, is represented by the following chemical formula 4.

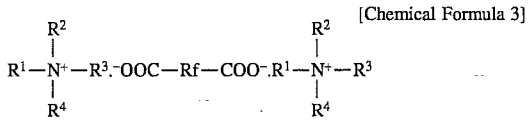

[Chemical Formula 3]

In the above formula, Rf denotes a perfluoro polyether chain and $R^1$, $R^2$, $R^3$, $R^4$ each denote hydrogen or a hydrocarbon residue.

[Chemical Formula 4]

In the above formula, Rf denotes a perfluoro polyether chain and $R^1$, $R^2$, $R^3$, $R^4$ each denote hydrogen or a hydrocarbon residue As the perfluoro polyethers having terminal carboxylic groups, any of the commercially available compounds may be employed.

The monofunctional perfluoro polyethers may be enumerated by (a) $F(CF_2CF_2CF_2O)_m CF_2CF_2COOH$ (b) $CF_3[OCF(CF_3)CF_2]_j(OCF_2)_k COOH$ On the other hand, the polyfunctional perfluoro polyethers may be enumerated by (c) $HOOCCF_2(OCF_2CF_2)_p(OCF_2)_q OCF_2COOH$ These compounds are given only for the sake of illustration. In the above chemical formula for perfluoro polyethers, m, j, k, p and q denote integers of not less than unity.

The molecular weight of the perfluoro polyethers having a terminal carboxylic group(s), for which there is imposed no particular limitation, is preferably 600 to 5,000 and more preferably 1,000 to 4,000. If the molecular fight of the perfluoro polyether becomes excessive, the effect of the terminal group(s) and the effect thereof as an adsorbent group are diminished, whereas the perfluoro polyether derivative becomes only difficultly soluble in solvents other than Freon, such as universal solvents including ethanol. Conversely, if the molecular weight of the perfluoro polyether is too low, the lubricating effects due to the perfluoro polyether chain are most.

The amines may be any of primary, secondary or tertiary amines. Quaternary ammonium compounds may also be employed. The structure of the amines may be selected arbitrarily, without regard to the molecular weight or to the presence or non-presence of a branched structure, isomeric structure, alicyclic structure, molecular weight or unsaturated bonds. The amines preferably contain an alkyl group(s). Above all, the amines may have an alkyl group(s) each having six or more and preferably ten or more carbon atoms for optimum results.

Meanwhile, with the perfluoro polyether derivatives, the perfluoro polyether chains may be partially hydrogenated, that is, a part of (50% or less of) fluorine atoms of the perfluoro polyether chains may be replaced by hydrogen atoms. In this case, partially hydrogenated perfluoro polyethers may be employed as the perfluoro polyethers, whereby the amount of consumption of the Freon-based solvent may be diminished. Examples of the partially hydrogenated perfluoro polyethers include (d) $F(CF_2CF_2CFO)_a(CFHCF_2CF_2)_b(CH_2CF_2CF_2O)_c CF_2CF_2COOH$ where a, b and c each denote an integer of not less than unity.

The perfluoro polyether derivative preferably has a molecular weight of 1,400 to 4,500. If the molecular weight of the perfluoro polyether derivative is lower or higher than the above range, the frictional coefficient cannot be diminished sufficiently and optimum running performance or durability cannot be developed. Besides, output characteristics of the recording medium after repeated running are lowered significantly.

In addition, with the present perfluoro polyether derivative, the molecular weight of a polar group moiety shown by the following chemical formula 5 is preferably 120 or less. If the molecular weight of the polar group moiety is larger than 120, the effect thereof as the adsorbent group is lowered due to the weakened interaction between the polar group moiety and the carbon film due in turn to steric hindrance of a hydrocarbon group contained in the polar group moiety.

[Chemical Formula 5]

In the above formula, $R^1$, $R^2$, $R^3$, $R^4$ each denote hydrogen or a hydrocarbon residue, respectively.

The above perfluoro polyether derivative may easily be synthesized from the above perfluoro polyether having a terminal carboxylic group and an amine by the following method.

That is, it may be synthesized by mixing the monofunctional or polyfunctional perfluoro polyether with an amine and heating the resulting mixture to a temperature exceeding the melting point of the amine used, such as 60° C., when using stearyl amine as an example.

Alternatively, it may be synthesized by dissolving the mono-or polyfunctional perfluoro polyether in an organic solvent such as Freon, and subsequently eliminating the solvent. If the amine is a quaternary ammonium compound, the perfluoro polyether derivative may be synthesized by extraction with an organic solvent from a mixture consisting of a metal salt such as a sodium salt of perfluoro polyether, and the quaternary ammonium salt such as chloride, iodide or sulfate.

The amine is coated preferably in an amount of 0.5 to 100 mg/m² and more preferably in an amount of 1 to 20 mg/m².

When using the perfluoro polyether as a lubricant the perfluoro polyether mixed with amine may be employed as a lubricant without using the perfluoro polyether derivative synthesized in advance by the above-described technique. If the perfluoro polyether mixed with amine be used, the above-mentioned perfluoro polyether derivative is generated in situ to display lubricating effects.

The mixing ratio of perfluoro polyether and amine may be set so that carboxylic groups constituting a polar group moiety of the perfluoro polyether derivative is equimolar with respect to amine (amino group). However, if the mixture is especially used as a lubricant for the magnetic recording medium, the mixing ratio may be set so that the amine is present slightly in excess for improving the lubricating effects. This is possibly ascribable to the fact that, when the lubricant is applied to the magnetic layer, the perfluoro polyether exhibiting acidity by the carboxylic group is preferentially adsorbed to the magnetic metal thin film (magnetic layer) which is basic so t hat the amine quantity is in deficit.

Consequently, when the perfluoro polyether derivative is employed as a lubricant for the magnetic recording medium, the molar ratio of the carboxylic group to amine (amino group) (amine/carboxylic group) is preferably set to 3/7 to 40/1.

Meanwhile, the above-mentioned derivatives may be used singly as a lubricant or combined with conventional lubricants.

For more durable lubricating effects under more hostile conditions, an extreme pressure agent may be used in combination at a weight ratio of 30:70 to 70:30.

The function of the extreme pressure agent is the friction or abrasion inhibitive action which is achieved by reaction of the extreme pressure agent with a metal surface under the heat of friction on partial metal contact in a boundary lubricating region resulting in the formation of a film of a reaction product. Examples of the extreme pressure agent include a phosphorus-based extreme pressure agent sulfur-based extreme pressure agent halogen-based extreme pressure agent an organometallic extreme pressure agent or a composite extreme pressure agent.

If need be, a rust-proofing agent may be used in compunction with the lubricant and the extreme pressure agent.

The rust-proofing agent may be any of those commonly employed as the rust-proofing agent for the magnetic recording medium. Examples of the rust-proofing agents include phenols, naphthols, quinones, heterocyclic compounds containing a nitrogen atom(s), heterocyclic compounds containing an oxygen atom(s) and heterocyclic compounds containing a sulfur atom(s).

The above-described magnetic recording medium according to the first subject-matter of the present invention is comprised of a magnetic metal thin film 102 on which are deposited its oxide layer 103 and a protective layer 104. Our eager searches have revealed that by setting the film thickness of each of the oxide layer 103 and the protective layer 104 so as to be equal to 20 to 230 Å, and by setting the combined total film thickness of the oxide layer 103 and the protective layer 104 so as to be equal to 40 to 250 Å, the magnetic recording medium may be improved significantly in durability without affecting electromagnetic transducing characteristics.

By providing the protective layer 104 on the oxide layer 103, and by setting the film thicknesses so as to be within the above-defined ranges, the film thickness of the oxide layer 3 may be rendered smaller than with the conventional recording medium while maintaining comparable durability for thereby improving electro-magnetic transducing characteristics.

Amine salts of the perfluoro polyether having a carboxylic group(s) at one or both terminals thereof (perfluoro polyether derivatives) exhibit superior lubricating effects to diminish the frictional coefficient. The lubricating properties of the perfluoro polyether derivative are not lost under stringent conditions of low temperature and/or low humidity. Consequently, by using the perfluoro polyether derivative as a lubricant excellent durability may be maintained, while running characteristics may be improved by the superior lubricating effects.

Besides, by setting the centerline mean roughness $R_a$ and the maximum height of the protrusions $R_{max}$ of the surface opposite to the magnetic layer forming surface of the non-magnetic base film so that $0.0015 \leq R_a \leq 0.0070$ μm and $0.015 \leq R_{max} \leq 0.070$ μm, respectively, a good running performance on the outer peripheral surface of the cooling can of the flexible supporting base film may be realized during vapor deposition of the magnetic layer on the flexible supporting base film travelling on the cooling can. Besides, since the flexible base film may be sufficiently cooled on the cooling can, there is no risk of surface degradation due to thermal deterioration or deterioration in production yield.

On the other hand, by bombarding the magnetic metal thin film, deposited on the base film in a vacuum chamber, at a predetermined making power density, the protective layer may be formed on the magnetic metal thin film with a satisfactory bonding power.

By properly selecting the film thicknesses of the oxide layer on the magnetic layer and the protective layer deposited on the oxide layer, the magnetic recording medium may be improved significantly in durability without deteriorating electromagnetic transducing characteristics.

Above all, even although the combined total thickness T of the oxide layer and the protective layer is set to the Order 0f 100 Å of less, with the thicknesses of the respective layers being thus lesser than with the conventional recording medium, it becomes possible to improve electro-magnetic transducing characteristics with maintenance of satisfactory durability and to diminish the bit error rate in digital recording to improve recording/playback characteristics.

Besides, since the perfluoro polyether derivative (amine salt) exhibiting satisfactory lubricating properties is retained as a lubricant on the protective film, the lubricating properties may be maintained under any operating conditions for an extended period of time. Consequently, the magnetic recording medium may be provided which exhibits superior running properties, abrasion resistance and durability under a variety of different operation conditions.

In addition, in the magnetic recording medium according to the present invention in which plural magnetic rectal thin films are formed on one of the surfaces of the flexible base film, the roughness of the running surface of the flexible base film is defined by setting the centerline mean roughness $R_a$ and the maximum height of the projections $R_{max}$ so as to be within the ranges of $0.0015 \leq R_a \leq 0.0070$ μm and $0.015 \leq R_{max} \leq 0.070$ μm, respectively. Consequently, a good running performance on the outer peripheral surface of the cooling can of the flexible supporting base film may be realized during vapor deposition of the magnetic layer on the flexible supporting base film travelling on the cooling can. Besides, since the flexible base film may be sufficiently cooled on the cooling can, there is no risk of surface degradation due to thermal deterioration, while the energy product error rate or the electro-magnetic transducing characteristics may be improved. In addition, there is no risk of creasing due to thermal deterioration, so that deterioration in production yield is hardly incurred.

On the other hand, a sufficient bonding power for the protective film may be assured by bombardment prior to deposition of the protective film to inhibit delamination of the protective film during sliding contact of the magnetic recording medium with the magnetic head to enable the production of a magnetic recording medium superior in durability and operational reliability.

BRIEF DESCRIPTION OF THE DRAWINGS

FIG. 8 is a schematic cross-sectional view showing a typical construction of a magnetic recording medium having, as a magnetic layer, stacked dual-layer magnetic metal thin films with an intermediate oxide layer in-between.

BEST MODE OF CARRYING OUT THE INVENTION

Figure 1:
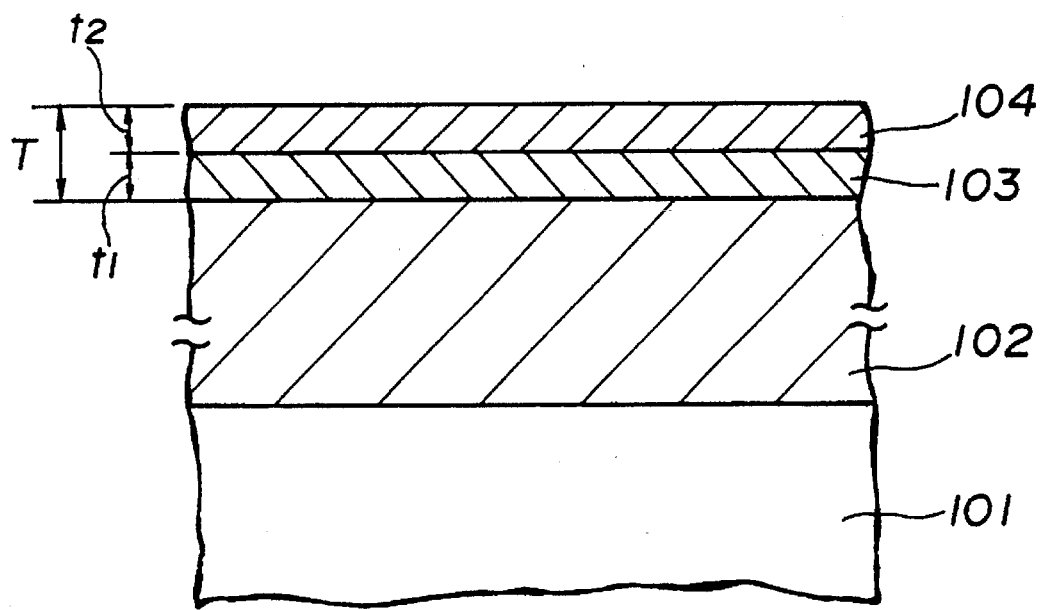
FIG. 1 is a schematic enlarged cross-sectional view showing an embodiment of a magnetic recording medium according to the present invention.

Referring to the drawings and results of experiments, illustrative embodiments of the present invention will be explained in detail.

Scrutiny into Film Thickness of Oxide Layer

A metal magnetic thin film 102, formed of $Co_{20}Ni_{80}$ (wt %), was oblique-deposited in oxygen on a base film 101 formed of polyethylene terephthalate (PET), as shown in FIG. 1. A typical oblique deposition device is explained by referring to FIG. 2.

Figure 2:
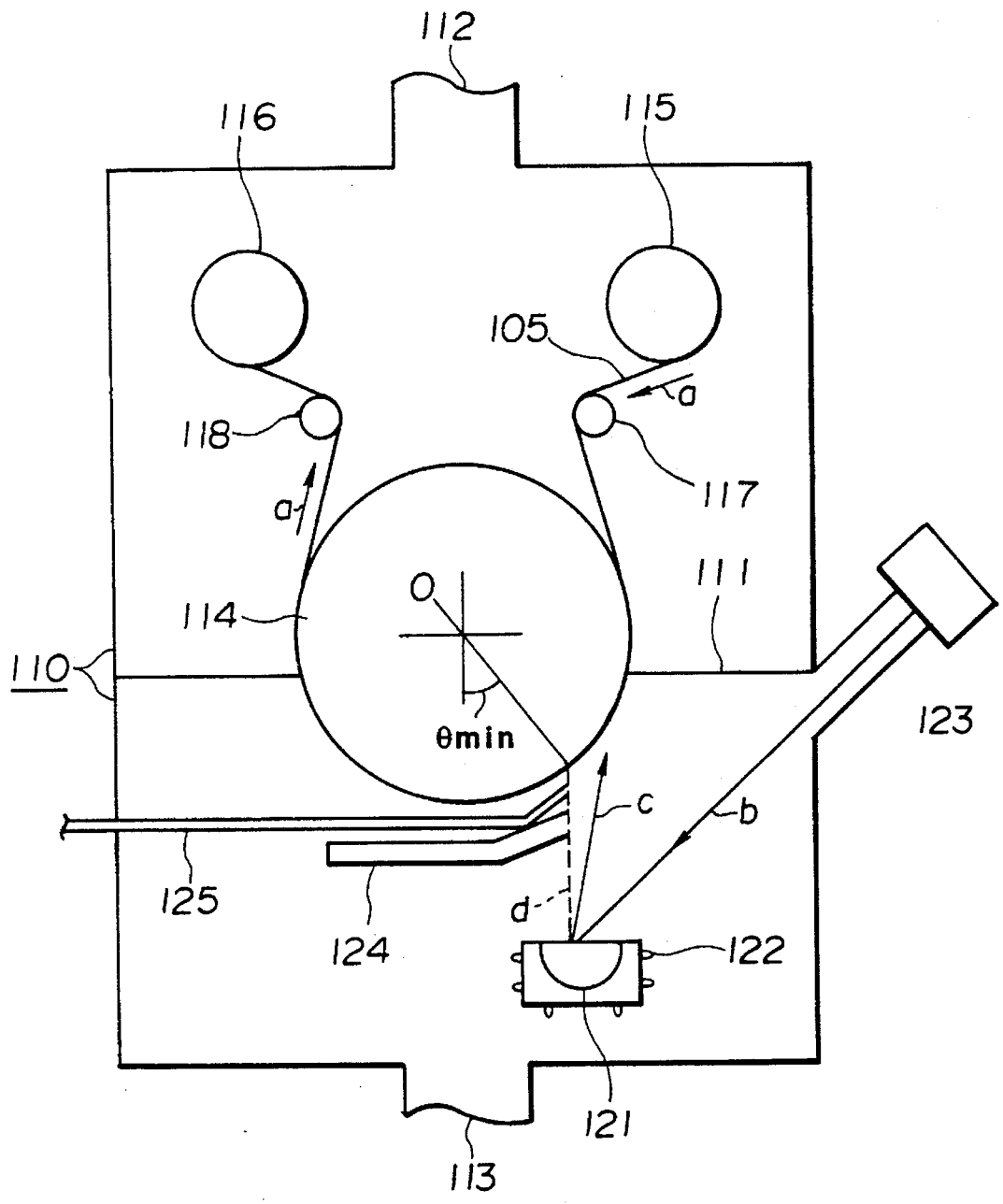
FIG. 2 is a schematic view showing an arrangement of a vapor deposition device.

In FIG. 2, 110 is a vacuum vessel having a centrally disposed cylindrical cooling can 114. A partitioning plate 111 is provided along the periphery of the cooling can 114 for dividing the inside of the vacuum vessel 110 into two parts, each of which is evacuated to a predetermined vacuum by evacuating means, not shown, connected to evacuating ports 112, 113. A magnetic recording medium 105, such as a magnetic tape, is adapted for being slidingly guided from a supply roll 115 to a take-up roll 116 along the cooling can 114 and guide rolls 117, 118 as indicated by arrow a.

An source of evaporation, that is a crucible 121, is provided below the right side of the cooling can 114 in FIG. 2. The material to be evaporated, contained in crucible 121, is bombarded and heated by an electron beam b from an electron gun 123 so as to be deposited on the magnetic recording medium 105 as indicated by arrow c. 122 is a spare heater for crucible 121.

A shutter 124 is provided below the cooling can 114 for vapor deposition on the magnetic recording medium 105 within a predetermined angular range. In this case, the shutter 124 is provided so that a minimum angle $\theta_{min}$ from a direction perpendicular to the film surface of the magnetic recording medium 105 is controlled by the shutter 124 to be equal to e.g. 45°, as indicated by a broken line d.

A gas inlet pipe 125 is positioned so that an oxygen gas, for example, is permeated within the above-mentioned range of deposition. The amount of the oxygen is also controlled so that an oxide 3 is deposited to a thickness $t_1$ on the surface of the magnetic metal thin film 102.

As shown in FIG. 1, a protective layer 104, formed e.g. of carbon, was deposited on the oxide layer 103 by e.g. dc magnetic sputtering art an Ar gas pressure of 10 retort and a power density of 6.8 W/cm². The protective layer 104 was controlled to be of a thickness $t_2$ by controlling the feed rate of the magnetic recording medium 105, herein a tape for vapor deposition.

Figure 3:
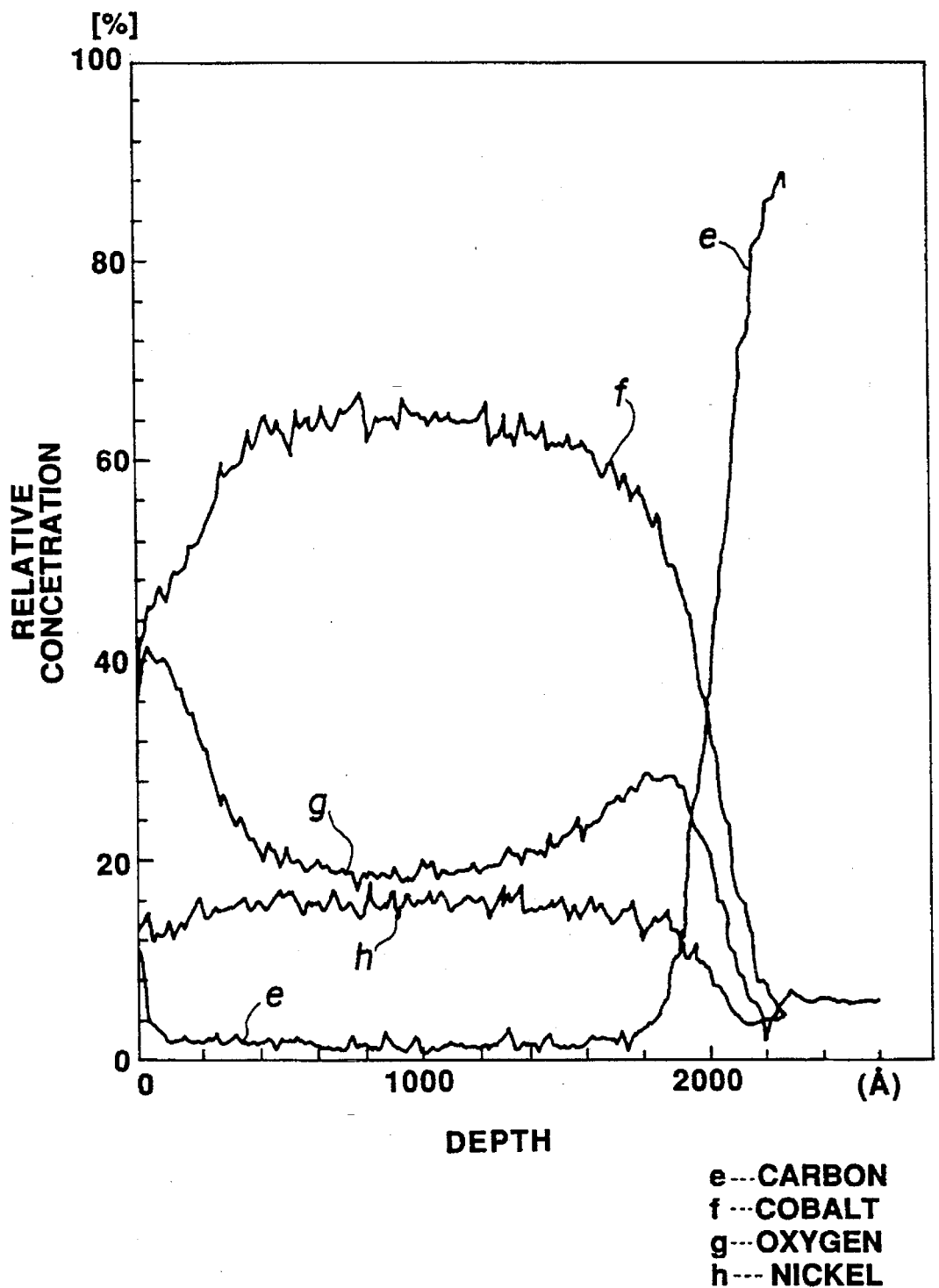
FIG. 3 is a graph showing a concentration profile along the depth of the cross-section of a typical magnetic recording medium.
Figure 4:
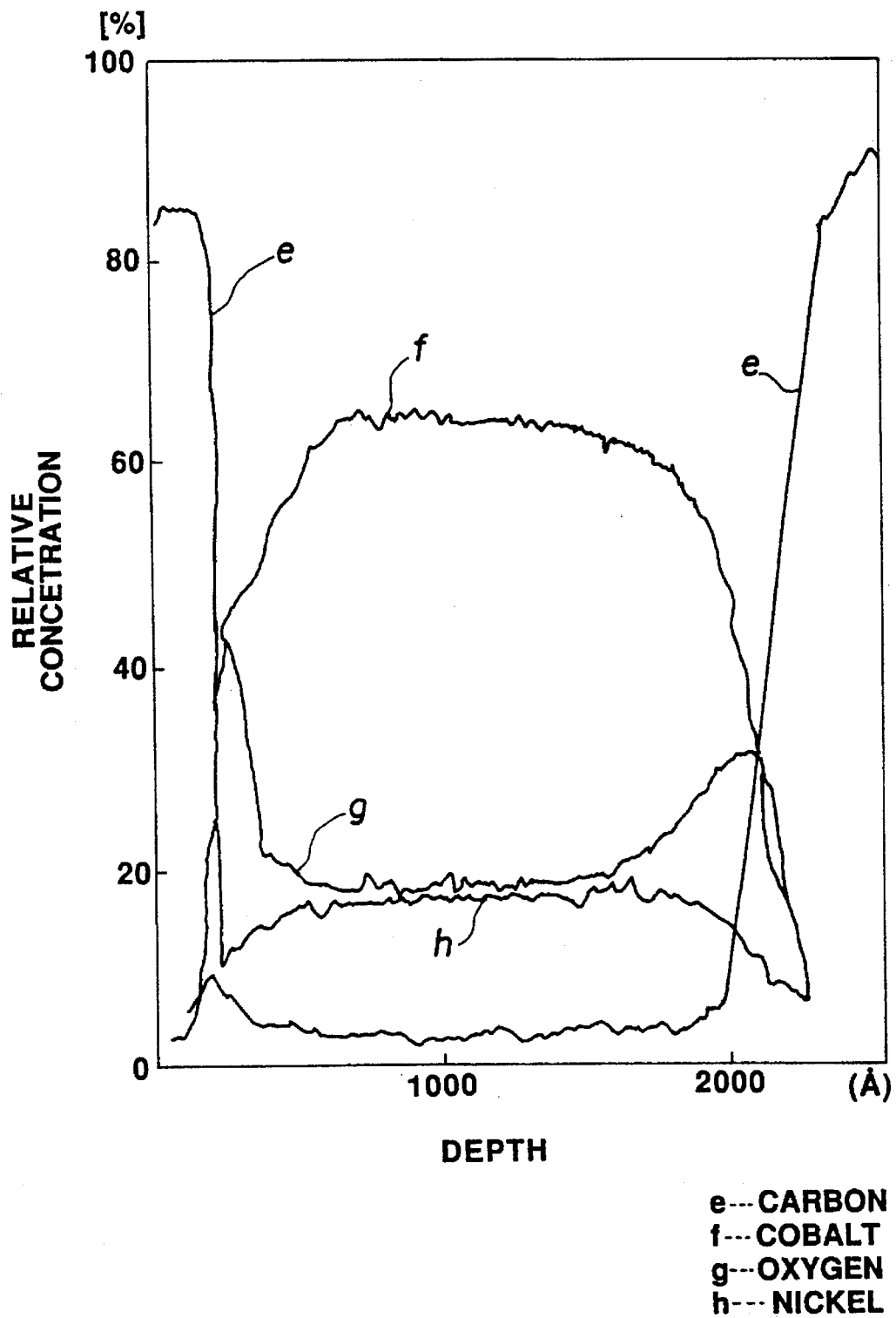
FIG. 4 is a graph showing a concentration profile along the depth of the cross-section of another typical magnetic recording medium.

FIGS. 3 and 4 show the profiles of relative concentration along the depth of the cross-section by Auger electron spectroscope (AES) of the magnetic recording medium 105 not coated with the protective layer 104 and the magnetic recording medium 105 of the present embodiment provided with the protective layer 104. In FIGS. 3 and 4, solid lines e, f, g and b indicate concentrations of carbon, cobalt oxygen and nickel, respectively. It may be sen form FIG. 3 that a non-magnetic cobalt oxide is formed to a larger thickness in the vicinity of the surface of the magnetic recording medium not provided with the protective layer 104. Conversely, with the present embodiments, shown in FIG. 4, the protective layer 104 of carbon is formed on the major surface, and the combined total thickness T of the protective layer 104 and the oxide layer 103 therebelow is on the order of 250≈ which is comprised within the range of not less than 40 Å and not more than 250 Å.

A number of samples of the magnetic recording medium 105 were prepared witch variable thicknesses $t_1$, $t_2$ of the oxide layer 103 and the protective layer 104 and variable total thicknesses T and measurement was made of the electromagnetic transducing characteristics, error rate and still durability, that is durability during the still mode, of these samples. In the following Examples 1 to 6 and Comparative Examples 1 to 3, measurements were made with variable thicknesses $t_1$ and $t_2$ of the respective layers 3 and 4, with the total thickness T remaining unchanged. The following are the values of the thicknesses $t_1$ and $t_2$ and the total thickness T in the respective Examples.

EXAMPLE 1

The thickness $t_1$ of the oxide layer 103 was set to 230 Å, while the thickness $t_2$ of the protective layer 104 was set to 20 Å.

EXAMPLE 2

The thickness $t_1$ of the oxide layer 103 was set to 200 Å, while the thickness $t_2$ of the protective layer 104 was set to 50 Å.

EXAMPLE 3

The thickness $t_1$ of the oxide layer 103 was set to 150 Å, while the thickness $t_2$ of the protective layer 104 was set to 100 Å.

EXAMPLE 4

The thickness $t_1$ of the oxide layer 103 was set to 100 Å, while the thickness $t_2$ of the protective layer 104 was set to 150 Å.

EXAMPLE 5

The thickness $t_1$ of the oxide layer 103 was set to 50 Å, while the thickness $t_2$ of the protective layer 104 was set to 200 Å.

EXAMPLE 6

The thickness $t_1$ of the oxide layer 103 was set to 20 Å, while the thickness $t_2$ of the protective layer 104 was set to 230 Å.

Comparative Example 1

The thickness $t_1$ of the oxide layer 103 was set to 250 Å, while the thickness $t_2$ of the protective layer 104 was set to 0

Comparative Example 2

The thickness $t_1$ of the oxide layer 103 was set to 240 Å, while the thickness $t_2$ of the protective layer 104 was set to 10 Å.

Comparative Example 3

The thickness $t_1$ of the oxide layer 103 was set to 10 Å, while the thickness $t_2$ of the protective layer 104 was set to 240 Å.

Using a tiled sendust sputter (TSS) type magnetic head, having a gap length of 0.2 μm and a track width of 20 μm and having its magnetic gap constituted by a magnetic metal thin film the film surface of which is non-parallel to the track width of the magnetic gap, the electro-magnetic transducing characteristics were measured of the respective samples, with the wavelength of 0.5 μm.

Also, using the TSS head having a gap length of 0.2 μm and a track width of 4 μm, digital receding was performed, and a bit error rate was measured.

The still durability was measured, using an 8-mm VTR manufactured and sold by SONY CORPORATION under the trade name of EV-S1, as the time until the playback output is decreased by 3 dB from an initial output of 0 dB, The results of measurement of the above characteristics are shown in Table 1.

TABLE 1

| | | thickness [Å] | | electro-magnetic transducing characteris- | bit error | still dura-bility |
|---|---|---|---|---|---|---|
| | | T | $t_1$ | $t_2$ | tics [dB] | rate | (hrs) |
| Ex. | 1 | 250 | 230 | 20 | 0 | $5 \times 10^{-4}$ | 5 |
| | 2 | 250 | 200 | 50 | −0.1 | $5 \times 10^{-4}$ | 9 |
| | 3 | 250 | 150 | 100 | 0 | $5 \times 10^{-4}$ | 20 |
| | 4 | 250 | 100 | 150 | +0.1 | $5 \times 10^{-4}$ | >20 |
| | 5 | 250 | 50 | 200 | 0 | $5 \times 10^{-4}$ | >20 |
| | 6 | 250 | 20 | 230 | 0 | $5 \times 10^{-4}$ | 20 |
| comp. Ex. | 1 | 250 | 250 | 0 | 0 | $5 \times 10^{-4}$ | 3 |
| | 2 | 250 | 240 | 10 | 0 | $5 \times 10^{-4}$ | 3.5 |
| | 3 | 250 | 10 | 240 | 0 | $5 \times 10^{-4}$ | 4.5 |

*T: total thickness
$t_1$: oxide layer
$t_2$: protective layer

It is seen from these results that the still durability is as short as three hours if the protective layer 104 is not provided as in Comparative Example 1, whereas, if the protective layer 104 is provided and its thickness $t_2$ is set to 20 Å or more, the still durability of five hours or longer as required may be achieved. On the other hand, if the thickness $t_1$ of the oxide layer 103 is 10 Å or less, the still durability as required cannot be achieved and, if the thickness $t_1$ is 20 Å or more, the still durability on the order of 20 hours may be achieved, as in Example 6. It is also seen that with the total thickness T remaining constant, the electro-magnetic transducing characteristics and the error rate remain substantially constant.

In the Examples 7 to 10 and Comparative Examples 4 and 5, respective samples of the magnetic recording medium were prepared with various different total thickness T and thicknesses $t_1$ and $t_2$ of the oxide layer 103 and the protective layer 104.

EXAMPLE 7

The thickness $t_1$ of the oxide layer 103, the thickness $t_2$ of the protective layer 104 and the total thickness T were set to 50 Å, 150 Å and 200 Å, respectively.

EXAMPLE 8

The thickness $t_1$ of the oxide layer 103, the thickness $t_2$ of the protective layer 104 and the total thickness T were set to 50 Å, 100 Å and 150 Å, respectively.

EXAMPLE 9

The thickness $t_1$ of the oxide layer 103, the thickness $t_2$ of the protective layer 104 and the total thickness T were set to 50 Å, 50 Å and 100 Å, respectively.

EXAMPLE 10

The thickness $t_1$ of the oxide layer 103, the thickness $t_2$ of the protective layer 104 and the total thickness T were set to 20 Å, 20 Å and 40 Å, respectively.

Comparative Example 4

The thickness $t_1$ of the oxide layer 103, the thickness $t_2$ of the protective layer 104 and the total thickness T were set to 50 Å, 250 Å and 300 Å, respectively.

Comparative Example 5

The thickness $t_1$ of the oxide layer 103, the thickness $t_2$ of the protective layer 104 and the total thickness T were set to 20 Å, 10 Å and 30 Å, respectively.

The electro-magnetic transducing characteristics, error rate and the durability of these samples of the magnetic recording medium were measured by the method similar to that shown in Table 1. The results are shown in Table 2.

TABLE 2

| | | thickness [Å] | | | electro-magnetic transducing characteristics [dB] | bit error rate | still durability (hrs) |
|---|---|---|---|---|---|---|---|
| | | T | $t_1$ | $t_2$ | | | |
| Ex. | 7 | 200 | 50 | 150 | +0.5 | $4 \times 10^{-4}$ | >20 |
| | 8 | 150 | 50 | 100 | +1.2 | $2 \times 10^{-4}$ | 20 |
| | 9 | 100 | 50 | 50 | +1.9 | $8 \times 10^{-5}$ | 8 |
| | 10 | 40 | 20 | 20 | +2.6 | $6 \times 10^{-5}$ | 7 |
| comp. | 1 | 300 | 50 | 250 | +0.8 | $9 \times 10^{-4}$ | >20 |
| Ex. | 2 | 30 | 20 | 10 | +2.9 | $5 \times 10^{-5}$ | 3 |

*T: total thickness
$t_1$: oxide layer
$t_2$: protective layer

It is seen from these results that if the total thickness T is set to a value exceeding 250 Å, such as 300 Å, the electro-magnetic transducing characteristics are deteriorated to increase the bit rate, even although good durability is achieved, as shown in Comparative Example 1, whereas, if the total thickness T is diminished gradually to values less than 250 Å, the electro-magnetic transducing characteristics are improved to lower the bit error rate significantly. It is also seen that if the total thickness T is reduced to a value less than 40 µm, such as 30 µm, the still durability is diminished to three hours, such that desirable durability is not achieved, even although the electro-magnetic transducing characteristics and the bit error rate are improved.

Consequently, the combined total thickness of the oxide layer 103 and the protective layer 104 is selected to be not less than 40 µm and not more than 250 µm. As also seen from Table 1, the respective thicknesses of the layers 103, 104 need to be in excess of 20 Å, so that the upper limit of each of these layers is selected to be not larger than 230 Å.

Above all, if the total thickness T of the oxide layer 103 and the protective layer 104 is not larger than approximately 100 Å, that is if the thicknesses of the layers 103, 104 are of lower values, the durability could be maintained at a satisfactory level, while the electro-magnetic transducing characteristics could be improved and the bit error rate could be improved significantly, as evidenced by Examples 9 and 10.

Although the protective layer 104 in the above Examples was formed of carbon, the durability could be improved without deteriorating the electro-magnetic transducing characteristics if, with the use of a variety of inorganic materials, such as $SiO_2$, $Si_3N_4$, $SiN_x$, BN or $ZnO_2$, as the material of the protective layer 104, the thickness of the protective layer is selected appropriately.

The present invention is not limited to the above described arrangements. For example, the protective layer 104 may be formed of organic materials, such as ethylene, while the protective layer 104 may be deposited by a variety of different methods, such as ion plating or plasma CVD.

Scrutiny into Plasma processing of the Surface of Oxide Layer

An arrangement of a producing device employed in the present embodiment is first explained.

Figure 5:
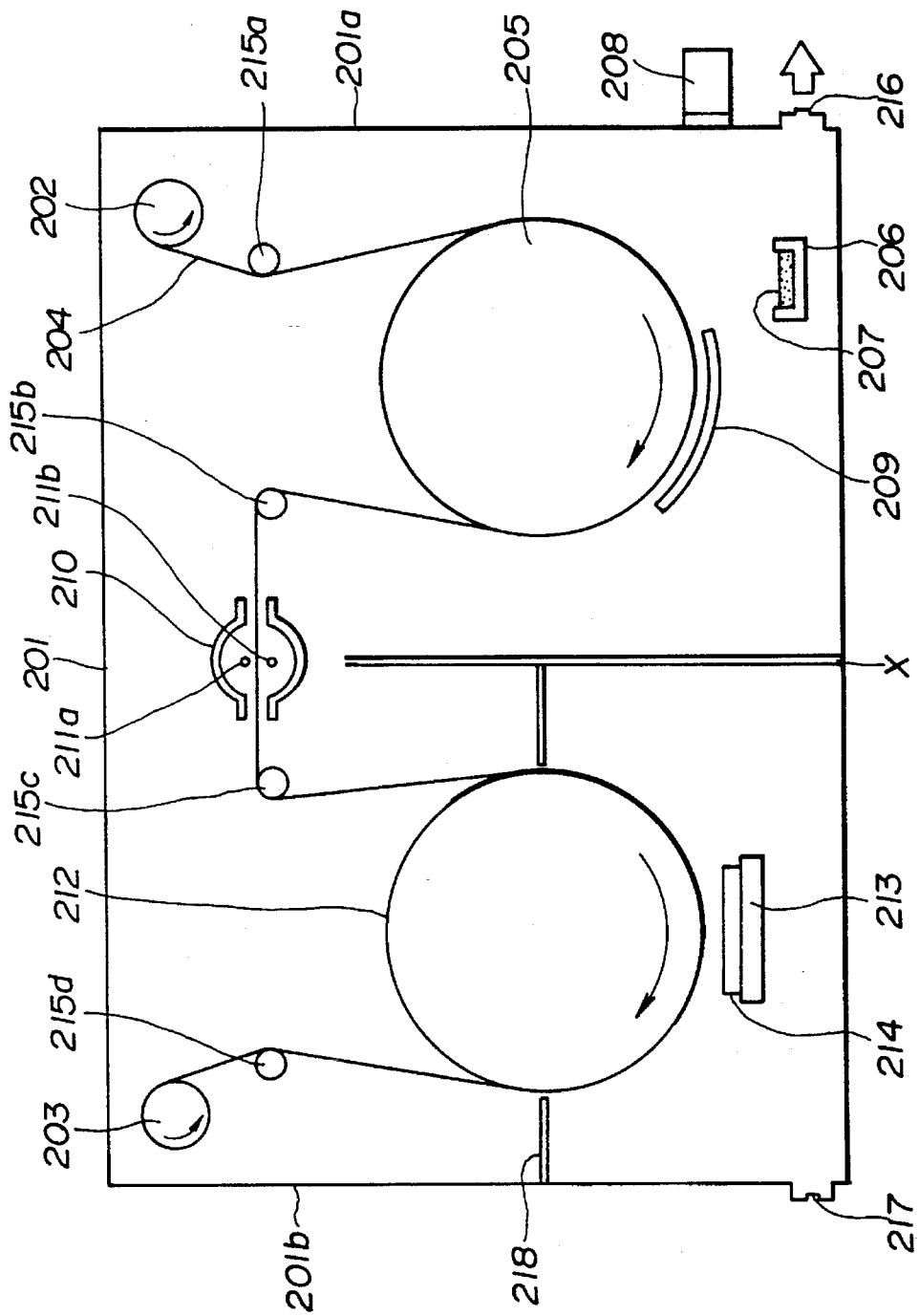
FIG. 5 is a schematic cross-sectional view showing an arrangement of a device for producing a magnetic recording medium by a method according to the present invention.

Referring to FIG. 5, a partitioning wall X is provided at a mid portion within a vacuum chamber 201. The vacuum chamber 201 is divided by this partitioning wall X into two regions. The region shown to the right in the drawing is a vacuum deposition chamber for deposition of a magnetic metal thin film, whereas the region shown to the left in the drawing is a sputtering chamber for depositing the protective film.

In an upper part of the vacuum chamber 201, a supply roll 202 and a take-up roll 203 are provided in the vicinity of the opposite lateral sides 201a, 201b, respectively. The supply roll 202 and the take-up roll 203 are adapted for being rotated counterclockwise in the drawing, so that a base film 204 fed out from the supply roll 202 is adapted to travel on its path so as to be taken up by the take-up roll 203.

A cooling can 205, adapted for being rotated clockwise in the drawing, is provided at a mid portion within the vapor deposition chamber provided with the supply roll 202. The base film 204, fed out from the supply roll 202, is adapted to travel along the outer periphery of the cooling can 205 at a constant velocity.

Below the cooling can 205 is mounted a crucible 206 within which a magnetic metal material 207 is charged.

Heating means 208 for heating and melting the magnetic metal material 207 is provided on the lateral side 201a of the vacuum chamber 201. This causes an electron beam radiated from the heating means 208 to be irradiated on the magnetic metal material 207 to vaporize the magnetic metal material. The vaporized magnetic metal material is then deposited on the base film 204 to form the magnetic metal thin film.

An arcuate shutter 209 is provided along the peripheral surface of the cooling can 205. This shutter covers a part of the surface of the base film 204 for limiting the incident angle of the vaporized magnetic metal material 207 on the surface of the base film 207.

A bombarding unit 210 is provided above the partition wall V in the drawing so that the base film 204 which has traversed the peripheral surface of the cooling can 205 is supplied to the bombarding unit 210.

The bombarding unit 210 is made up of a pair of bar-shaped electrodes 211a, 211b, arranged facing each other, with the base film 204 travelling through the inside of the bombarding unit 210 in-between, for bombarding the surface of the magnetic metal thin film formed on the base film 204 by applying a voltage across these electrodes 211a, 211b. The electrodes 211a, 211b may be of a dc type or an ac type, as desired.

Within the sputtering chamber, provided adjacent to the vacuum deposition chamber, there is provided a largediameter can 212 adapted for being rotated clockwise in the drawing. The base film 204, which has traversed the bombarding unit 210, is adapted to travel along the outer peripheral surface of the can 212.

Below the can 212, there is provided a cathode electrode 213, on which a target 214 is secured. The target 214 is provided facing the periphery of the can 212 for sputtering on the base film 204 travelling along the outer periphery of the can 212.

Within the sputtering chamber, there is provided a partitioning plate 218 at right angles to the partitioning wall X. Sputtering is adapted to take place only within a lower region below the partitioning plate 218. This prevents the sputtering gas from being diffused above the partitioning plate 218 for improving the sputtering efficiency.

Guide rolls 215a to 215d are provided between the supply roll 202 and the cooling can 205, between the cooling can 205 and the bombarding unit 210, between the bombarding unit 210 and the can 212 and between the can 212 and the take-up roll 203, respectively, for applying a predetermined tension to the base film 204 travelling from supply roll 202 to the take-up roll 203 for assuring smooth running o the base film 204.

Using the above-described producing device, a magnetic tape was prepared in accordance with the following procedure.

Oblique vapor deposition was carried out on a polyester base film 10 μm in thickness in a vacuum chamber maintained at a predetermined vacuum.

As the base film supplied from the supply side was caused to travel along the outer surface of the cooling can along the vapor deposition chamber, the magnetic metal material charged in a crucible was heated and melted by predetermined heating means for vaporizing the magnetic metal material. In the present embodiment the magnetic metal material was $Co_{80}Ni_{20}$ alloy, with the subscript numbers indicating the composition in wt %. The vaporized magnetic material was deposited on the base film for forming a magnetic metal thin film.

For oblique vapor deposition, an oxygen gas was introduced onto the surface of the base film at a predetermined rate at a setting of the minimum incident angle of 45° of the magnetic material with respect to the base film surface. The feed rate of the base film was set so that the film thickness of the magnetic metal base film amounted to 200 μm.

The oxide layer on the magnetic metal thin film, thus formed on the base film, was bombarded by the bombarding unit. Meanwhile, an Ar gas was introduced into the bombarding unit for bombardment.

Then, as the base film which traversed the bombarding unit was run along the outer peripheral surface of the can provided below the bombarding unit a carbon film was deposited as a protective film to a film thickness of 100 Å on the magnetic metal thin film by dc magnetron sputtering under a continuous take-up system.

For sputtering, the vacuum in the sputtering chamber was set to 2 Pa. A target (carbon) secured to the cathode electrode was arranged at a distance of 8 cm from the peripheral surface of the can. Sputtering was carried out as the base film was run at a feed rate of 2 m/sec. The making power of the cathode electrode was set to 6.8 $W/cm^2$.

For checking into the effect of the bombardment operation, Auger electron spectroscopic analysis along the depth from the magnetic tape surface was carried out using a magnetic tape which could be obtained with the making power density during bombardment of 18.9 $kW/m^2$.

Figure 6:
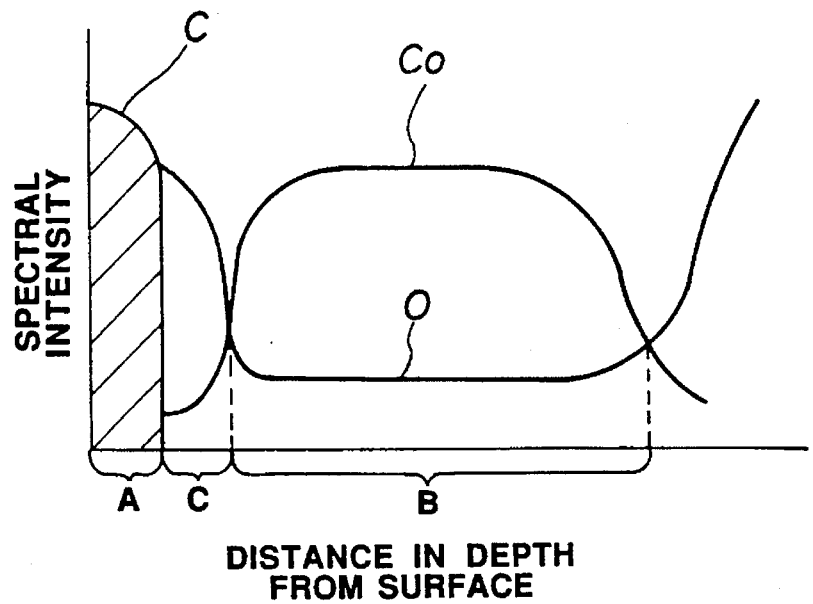
FIG. 6 is a graph showing a depth profile by Auger electron spectroscopic analysis of a magnetic recording medium produced by bombardment following the deposition of the magnetic metal thin film.

It was indicated by this analysis that since an oxygen-containing region C was present between a region A in the vicinity of the magnetic tape surface formed mainly of carbon (region corresponding to the protective film) and a region B formed mainly of Co and oxygen (region corresponding to the magnetic metal thin film), an oxidized surface layer should be interposed between the protective film and the magnetic metal thin film, as shown in FIG. 6. The oxidized surface film had a film thickness o approximately 130 Å, with the combined thickness thereof with he protective film being 230 Å.

Figure 7:
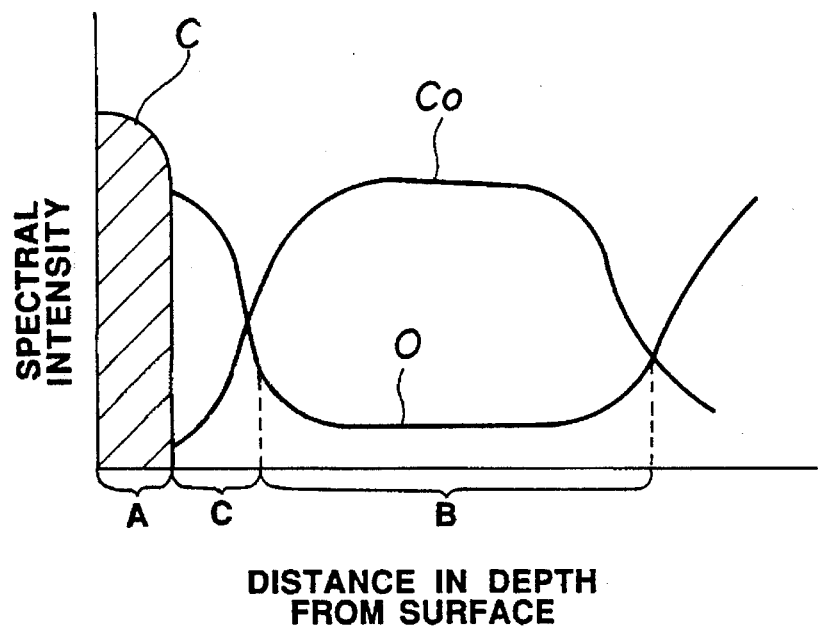
FIG. 7 is a graph showing a depth profile by Auger electron spectroscopic analysis of a magnetic recording medium produced by deposition of the protective film without bombardment following deposition of the magnetic metal thin film.

By way of comparison, a protective film was formed after deposition of the magnetic metal thin film without carrying out a bombardment operation, and an Auger electron spectroscopic analysis was carried out along the depth from the tape surface. The analysis revealed that the oxidized surface layer was interposed between the protective film and the magnetic metal thin film, as when the bombardment operation was carried out as shown in FIG. 7. However, in this case, the film thickness of the oxidized surface layer amounted to approximately 200 Å, with the total film thickness with the protective film being 300 Å.

It was now seen from the above results that the bombardment operation led to the reduction in thickness of the oxidized surface layer.

Scrutiny was then made into the durability and the electromagnetic transducing characteristics of the above described magnetic tape.

That is, the still durability and the playback output for the wavelength of 0.5 μm were checked of magnetic tapes produced with the making power densities during bombardment of 1.6 $kW/m^2$, 11.8 $kW/m^2$ and 18.9 $kW/m^1$ (Examples 1 to 31), a magnetic tape in which, for comparison sake, a protective film was formed without bombardment after deposition of the magnetic metal thin film (Comparative Example 6), a magnetic tape in which the bombardment operation was carried out in an oxygen gas atmosphere (Comparative Example 7) and a magnetic tape in which the making power density during bombardment was set to 1.11 $kW/m^2$ (Comparative Example 8). The results are shown in Table 3.

Meanwhile, the still durability was evaluated based on the time elapsed until the playback output deteriorated by 3 dB from an initial value in the course of still running on the remodelled machine of EV-Si by SONY CORPORATION at a relative velocity of 7.5 m/sec between the magnetic head and the medium.

TABLE 3

| | bombarding conditions | | | | | |
|---|---|---|---|---|---|---|
| | voltage (V) | current (A) | making power density ($kW/m^2$) | gases | still durability (hrs) | playback output (dB) |
| Ex. 11 | 200 | 0.1 | 1.6 | Ar | 12 | +0.2 |
| Ex. 12 | 300 | 0.5 | 11.8 | Ar | >20 | +0.5 |
| Ex. 13 | 400 | 0.6 | 18.9 | Ar | >20 | +0.7 |
| comp. Ex. 6 | — | — | — | none | 0.5 | 0 |
| comp. Ex. 7 | 300 | 0.5 | 11.8 | $O^2$ | >20 | −0.8 |
| comp. Ex. 8 | 180 | 0.08 | 1.1 | Ar | 1.5 | 0 |

It is seen from Table 3 that if the surface of the magnetic metal thin film, produced by vapor deposition as in the present embodiment the bonding power of the protective film to the magnetic metal thin film is improved to assure satisfactory still durability. Also the oxidized surface layer formed on the magnetic metal thin film is reduced in thickness to diminish the spacing losses to improve the playback output significantly.

It has also been found that if the above-mentioned bombardment operation is not carried out of if the making power density during bombardment is low, the bonding power of the protective film cannot be increased, while the still durability cannot be improved. On the other hand, if the bombardment is carried out in an oxygen gas atmosphere, the surface of the magnetic metal thin film keeps on to be oxidized so that considerable deterioration is incurred in the output characteristics due to spacing loses, even although the durability was improved to some extent.

Meanwhile, if the bombardment operation is carried out directly after the deposition of the magnetic metal thin film by the oblique vapor deposition in the vacuum chamber, the produced magnetic tape is once taken up and a protective film is formed thereon in a separate vacuum chamber to depart from an in-line operation (Comparative Example 4), a sufficient bonding power between the protective film and the magnetic metal thin film cannot be developed so that the still durability was significantly lowered.

Scrutiny into Intermediate Oxidized Layer in Multilayered Structure

EXAMPLE 14

In the present Example, two magnetic metal thin films, each having an inclined columnar structure grown in a forward direction relative to a line normal to the non-magnetic base film, are formed by oblique vapor deposition on the non-magnetic base film, with an intermediate layer interposed between these thin films, for producing a forward two-layered type magnetic tape.

Figure 8:
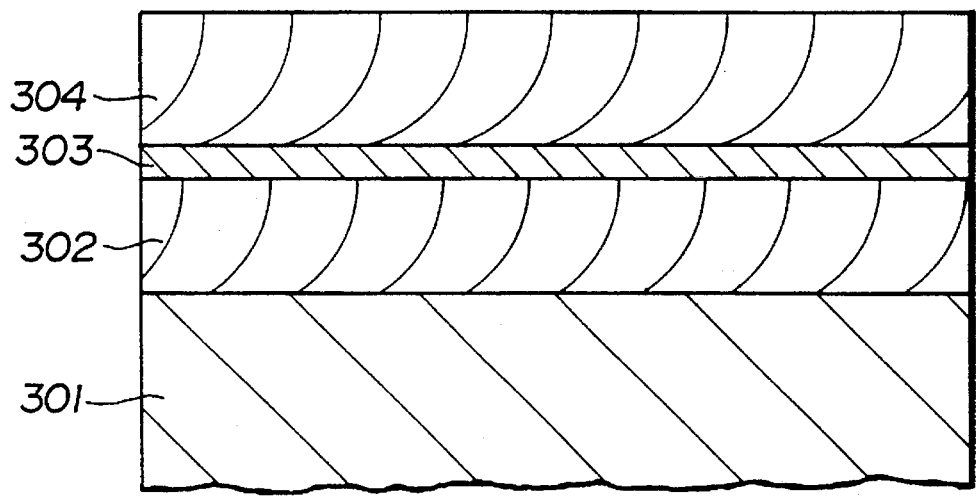

The magnetic tape in the present embodiment is comprised of a non-magnetic base film 301 of polyethylene terephthalate and a first magnetic metal thin film 302 formed thereon to a thickness of 900 Å, as shown in FIG. 8. The first magnetic metal thin film 302 has an inclined columnar structure in which the column is inclined the more pronouncedly relative to the line normal to the base film 301 the closer the column is to the base film 301 and the column is inclined the less pronouncedly relative to the normal line the further away the column is from the base film 301.

An intermediate layer 3 formed of a cobalt oxide film is provided on the first magnetic metal thin film 302. The film thickness of the first intermediate layer 303 is approximately 200 Å.

A second magnetic metal thin film 304 is formed on the first intermediate layer 303 to a thickness of 900 Å. The direction of growth of the inclined columnar structure of the second magnetic metal thin film 304 is the same as that of the first magnetic metal thin layer 302.

With the above-described magnetic tape, the first magnetic metal thin film 302 and the second magnetic metal thin film 304 are stacked with the first intermediate layer 303 in-between, by way of the recording layer, and has a two-layered structure, as long as the magnetic metal thin film structure is concerned. The total thickness of the recording layer is 2000 Å, with the thickness of the first intermediate layer 303 accounting for 10% of the total film thickness.

The method for producing the magnetic tape is hereinafter explained.

Figure 9:
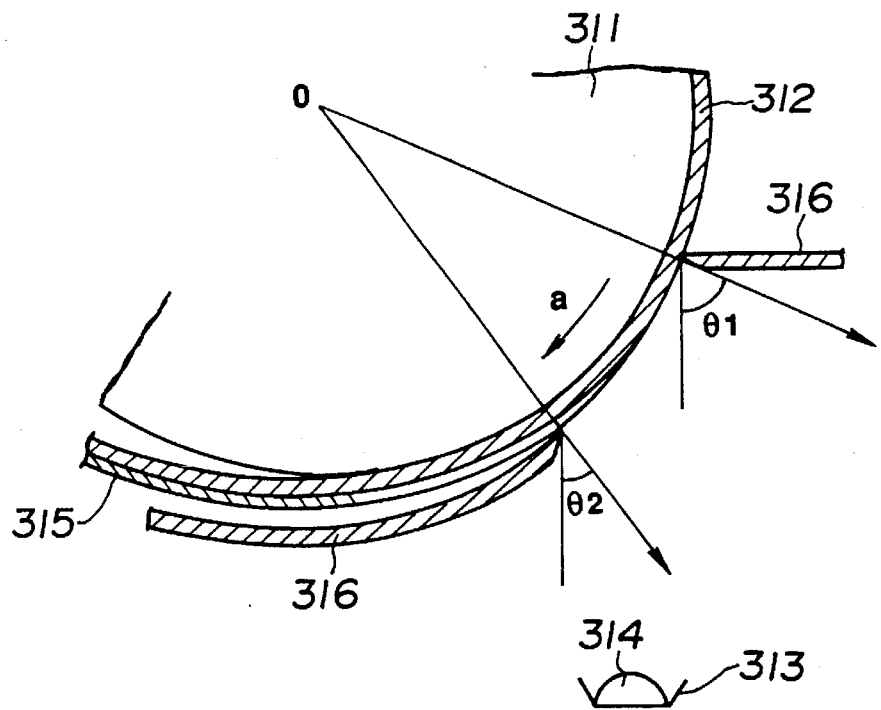
FIG. 9 is a graph showing a depth profile by Auger spectroscopic analysis of the magnetic recording medium shown in FIG. 8.

A non-magnetic base film 312 was wrapped around the outer peripheral surface of a drum 311 and, as the base film 312 was moved in a direction shown at a in FIG. 9 with rotation of the drum 311, a vapor stream from an evaporation source 314 charged in a crucible 313 was impinged on the base film 312 at an angle of incidence relative to a line normal to the base film 312 for depositing the magnetic metal material on the non-magnetic base film 312, as shown in FIG. 9. A pair of shutters 306, 306 were provided which are opened in a range of from the maximum angle of incidence $\theta_1$ to a minimum angle of incidence $\theta_2$. The oblique deposition was started at the maximum angle of incidence $\theta_1$ and the angle of incidence was continuously changed with movement of the non-magnetic base film 312 to carry out vapor deposition on an area of the base film 312 exposed to the shutters 316, 316 up to a region delimited by the minimum angle of incidence $\theta_2$ for forming a magnetic metal thin film 315 on the non-magnetic base film 312.

Then, as the non-magnetic base film 301 was moved in one direction, a vapor stream from the evaporation source (pure Co) was impinged on the non-magnetic base film 301 at a predetermined angle of incidence and, as the angle of incidence was changed continuously, the oblique vapor deposition was carried out to deposit the first magnetic metal thin film 302 on the non-magnetic base film 301.

Then, using pure Co as a target the first intermediate layer 303 was formed by magnet ton sputtering on the first magnetic metal thin film 302. The sputtering conditions were an $O_2$ gas low rate of 200 SCCM, an $O_2$ flow rate of 70 SCCM and the running velocity of the non-magnetic base film of 10 m/min.

The second magnetic metal thin film 304 was formed on the first intermediate layer 303 by the oblique vapor deposition similar to that performed for the first magnetic metal thin film 302, for producing a magnetic tape.

Figure 10:
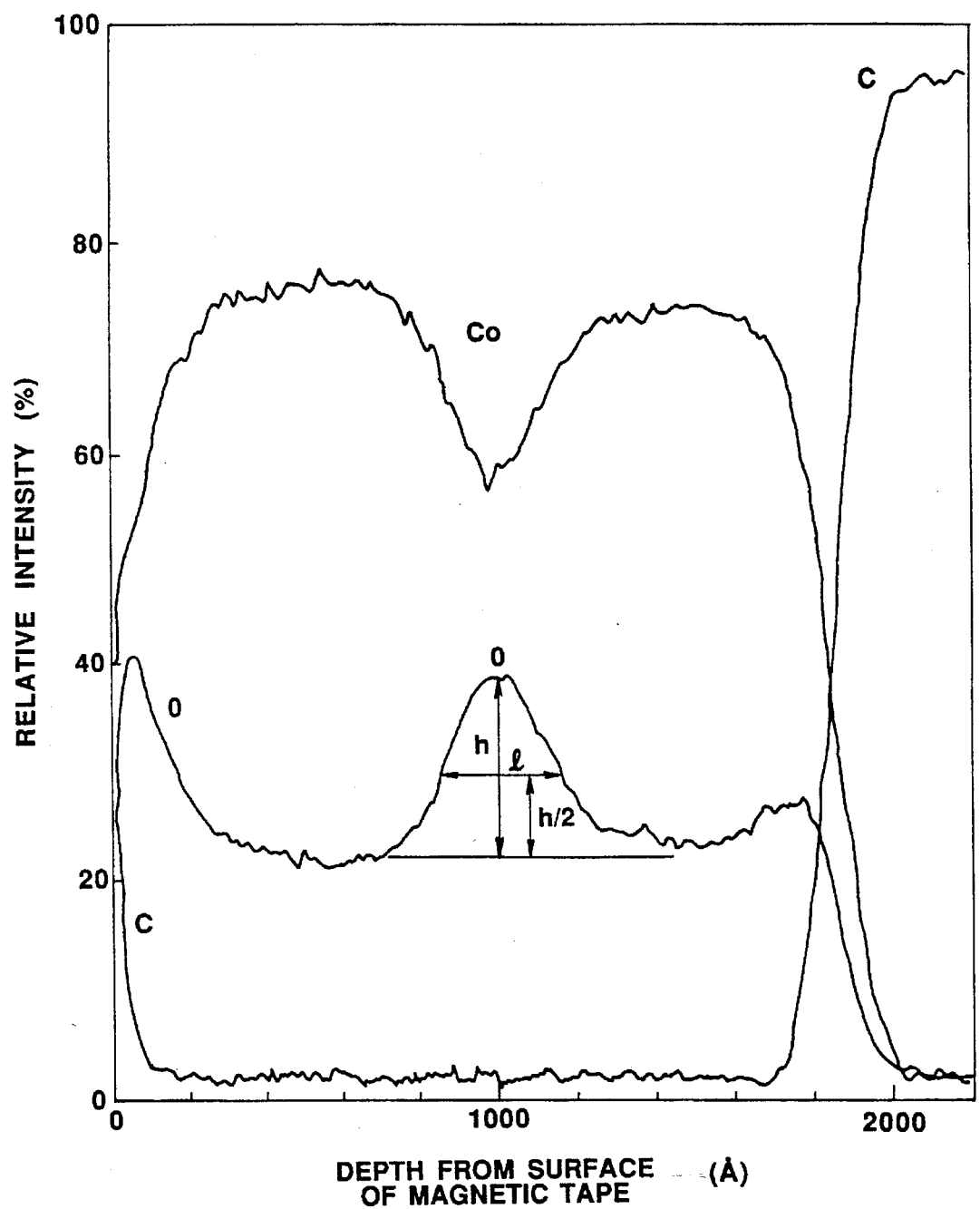
FIG. 10 is a partial schematic side view for illustrating the definition of the incident angle of a vapor flow in the course of production of the magnetic recording medium shown in FIG. 8.

For analyzing the composition of the recording layer, the depth profile was analyzed, using an Auger electron spectroscopic device manufactured and sold by NIPPON DENSHI KK under the trade name of Jamp 30. It was revealed from the analysis that since a peak of oxygen atoms appears in the vicinity of the depth of 1000 Å from the tape surface, with relative decrease in Co peak, as shown in FIG. 10, the first intermediate layer 303 of a cobalt oxide film was formed between the first magnetic metal thin film 302 and the second magnetic metal thin film 304. The film thickness of the first intermediate layer 303 was certainly approximate to 200 Å, as ascertained by the half value width l of the peak of the oxygen atom in the vicinity of 1000 Å (the width of peak at height h/2). Meanwhile, an oxide layer having a film thickness of 50 Å was formed on the surface of the second magnetic metal thin film.

A back-coat layer was formed by a usual technique on the opposite surface of the non-magnetic base film. The magnetic tape was completed by formation of a top coat layer comprised of a carbon protective layer (150 Å) and a lubricant followed by a rust-proofing process.

EXAMPLE 15

The forward two-layered type magnetic tape was prepared in the same way as in Example 14 except using the film thickness of each of the first and second magnetic metal thin films of 950 Å and the film thickness of the intermediate layer of 100 Å. The ratio of the thickness of the intermediate layer to the total thickness (2000 Å) was set to 5%.

EXAMPLE 16

A forward three-layered magnetic tape was prepared in the same manner as in Example 1, except forming a third magnetic metal thin film on the second magnetic metal thin film with the interposition of a second intermediate layer 200 Å thickness with the direction of growth of the inclined columnar structure of the third magnetic metal thin film being the forward direction with respect to the direction of growth for the first and second magnetic metal thin films.

Meanwhile, the second and the third magnetic metal thin films were deposited by the same method as that used for the deposition of the first intermediate layer and the first magnetic metal thin film in Example 14.

The film thickness of each of the magnetic metal thin films was set to 530 Å, with the ratio of the total thickness of the two layers to the total thickness (2000 Å) of the recording layer being 20%.

EXAMPLE 17

A reverse two-layered magnetic tape was prepared in the same way as in Example 1, except setting the direction of growth of the inclined columnar structure of the second magnetic metal thin film so as to be reversed from that of the first magnetic metal thin film.

That is, the second magnetic metal thin layer was formed by running the non-magnetic base film in the opposite direction to that in which the tape was run during formation of the first magnetic metal thin film.

The thickness of the first intermediate layer was set to 200 θ, which accounted for 10% of the total thickness of the recording layer (2000 Å).

Comparative Example 9

A single-layer type magnetic tape was prepared by depositing a first magnetic metal thin film, as a sole recording layer, 2000 θ in thickness, on a non-magnetic metal thin film, by the same technique as that used in Example 14.

Comparative Example 10

For comparison sake, a forward two-layered magnetic tape was prepared in the same way as in Example 14 except using the thickness of the intermediate layer of 500 Å and the ratio of the thickness of the intermediate layer to the total thickness of the recording layer (2000 Å) of 25%.

Output characteristics and the C/N ratio of the magnetic produced as above were checked. The results are shown in Table 4.

Meanwhile, by way of measuring the output characteristics, the playback outputs of the respective magnetic tapes were measured using an 8-mm video tape recorder manufactured and sold by SONY CORPORATION under the trade name of EVS-900, with the wavelength of input signals being 0.5 µm. The C/N ratio was measured using the above 8-mm video tape recorder EVS-900 by SONY CORPORATION, with the wavelength of input signals being 0.5 µm. The measured values were indicated as relative values for the value of magnetic tape of Comparative Example 9 of 0 dB.

TABLE 4

|  | recording layer structure | thickness (Å) of each intermediate layer | rate (%) of total thickness of intermediate layer | output characteristic (dB) | C/N ratio (dB) |
| --- | --- | --- | --- | --- | --- |
| Ex. 14 | forward two layers | 200 | 10 | +1.6 | +2.5 |
| Ex. 15 | forward two layers | 100 | 5 | +2.0 | +2.6 |
| Ex. 16 | forward three layers | 200 | 20 | +2.0 | +2.9 |
| Ex. 17 | reverse two layers | 200 | 10 | +0.9 | +1.2 |
| comp. Ex. 9 | sole layer | — | — | 0 | 0 |
| comp. Ex. 10 | forward two layers | 500 | 25 | −1.0 | +1.0 |

It was seen that, with the magnetic tape in which the ratio of the combined total thickness of the intermediate layers to the total thickness of the recording layer is set so as to be 20% or less, satisfactory results could be obtained with respect to output characteristics and the C/N ratio, as shown in Table 4,

EXAMPLE 18

In the present Example, a forward two-layered magnetic tape was prepared, in which, by changing the angle of incidence of a vapor stream to a line normal to a non-magnetic base film in a range of from 40° to 70°, two magnetic metal thin films were deposited on the base film so that the inclined columnar structures thereof were grown in the same direction.

First an undercoat film having minute protrusions was formed on one of the surfaces of a non-magnetic base film of polyethylene terephthalate of 10 µm thickness by coating an undercoating solution, such as an acrylic emulsion thereon. Then, as the base film was run in one direction, a vapor stream from an evaporation source was impinged thereon so that the angle of incidence relative to a line normal to the base film decreased continuously, by way of an oblique vapor deposition. A first magnetic metal thin film was deposited on the non-magnetic base film to a thickness of 1000 Å, until the minimum angle of incidence of 40° was reached, with the maximum angle of incidence at the start of the vapor deposition being 70°. For the oblique vapor deposition, a $Co_{80}Ni_{20}$ alloy was used as source of evaporation, and the $O_2$ gas flow introduced into the atmosphere of evaporation was set to 200 SCCM, with the running speed of the non-magnetic base film being set to 10 m/sec. The oblique vapor deposition was carried out repeatedly under the same conditions for depositing a second magnetic metal thin film on the first magnetic metal thin film. If the running direction of the base film is the same as that used for vapor deposition of the first magnetic metal thin film, the direction of growth of the inclined columnar structure of the second magnetic metal thin film is the same as that of the first magnetic metal thin film. Meanwhile, an oxide layer was formed on the surface of the second magnetic metal thin film to a thickness of 50 Å.

A back-coat layer was hen formed on the opposite surface of the non-magnetic base film. After forming a top coat layer consisting of a protective carbon layer (150 Å) and a lubricant, a rust-proofing operation was carried out under prescribed conditions for completing a magnetic tape.

EXAMPLE 19

A magnetic tape was prepared in the same way as in Example 18 except changing the maximum angle of incidence and the minimum angle of incidence to 65° and 45°, respectively.

Comparative Example 11

For comparison, oblique vapor deposition was carried out for depositing a magnetic metal thin film with the range of change of the angle of incidence being increased to 90°.

That is, a magnetic tape was prepared in the same way as in Example 18, except changing the maximum angle of incidence to 90°, with the minimum angle of incidence $\theta_2$ of 40° remaining the same.

Output characteristics and frequency characteristics were checked of the Examples 18, 19 and the Comparative Example 11. The results are shown in Table 5.

The output characteristics are measured values of the playback output for the input signal wavelength of 0.5 μm, indicated as relative values with respect to the corresponding values for Comparative Example 11. The frequency characteristics are relative values with respect to Comparative Example 3 for indicating to which extent the attenuation of the playback output at 10 MHz has been compensated relative to the playback output at 5 MHz.

TABLE 5

|  | output characteristics (dB) | frequency characteristics (dB) |
| --- | --- | --- |
| Ex. 18 | +0.5 | +2.1 |
| Ex. 19 | +0.7 | +2.5 |
| Comp. Ex. 11 | 0 | 0 |

It is seen from Table 5 that satisfactory output characteristics may be obtained in accordance with the present invention. It is also seen that if Comparative Example 11 is taken as a reference, the attenuation of the playback output at 10 MHz is suppressed as compared to that at 5 MHz.

EXAMPLE 20

In the present Example, the oblique vapor deposition was carried out for forming forward two-layered magnetic metal thin films on the non-magnetic base film, with the interposition of an oxide intermediate layer between the magnetic metal thin films, by continuously changing the angle of incidence of the vapor stream with respect to the line normal to the non-magnetic base film from 70° to 40°.

As the non-magnetic base film of polyethylene terephthalate of 10 μm thickness, on which a coating film of an undercoat solution, such as an emulsion, was applied in advance, was run at a rate of 10 m/sec in one direction, oblique vapor deposition was carried out in the same way as in Example 18 for forming a first magnetic metal thin film of 900 Å thickness on the non-magnetic base film. For the oblique vapor deposition, the maximum angle of incidence $\theta_1$ and the minimum angle of incidence were $\theta_2$ set to 70° and 40°, respectively. Magnetron sputtering was then carried out in the same way as in Example 14 for depositing a cobalt oxide intermediate layer on the first magnetic metal thin film to a thickness of 200 Å.

Oblique vapor deposition was then carried out in the same way as for the first magnetic metal thin film for depositing a second magnetic metal thin film on the intermediate layer to a film thickness of 900 Å.

The recording layer of the magnetic tape, prepared in this manner, is of a dual-layered structure consisting of the first and second magnetic metal thin films, deposited on the non-magnetic base film with the intermediate film in-between, with the total thickness being 2000 Å. The thickness of the first intermediate layer accounts for 10% of the total thickness of the recording layer. Besides, an oxide layer was formed on its surface to a thickness of 50 Å.

A back-coat layer was then formed on the opposite surface of the non-magnetic base film. After forming a top coat layer consisting of a protective carbon layer (150 Å) and a lubricant a rust-proofing operation was carried out under prescribed conditions for completing a magnetic tape.

EXAMPLE 21

A magnetic tape was prepared in the same way as in Example 20, except changing the maximum angle of incidence to 65° and setting the running velocity of the non-magnetic base film to 20 m/sec.

Meanwhile, the thickness of the intermediate layer was set to 100 Å, while the ratio of the thickness of the intermediate layer to the total thickness of the recording layer was set to 5%.

Using the magnetic tapes produced in Examples 20 and 21, output characteristics and the C/N ratio were checked in accordance with he above method. The results are shown in Table 6.

TABLE 6

|  | Ex. 20 | Ex. 21 |
| --- | --- | --- |
| vapor stream incidence angle (°) | $\theta_1 = 40$ | $\theta_1 = 40$ |
|  | $\theta_2 = 70$ | $\theta_2 = 65$ |
| intermediate layer thickness (Å) | 200 | 100 |
| tape running speed (m/min) | 10 | 20 |
| output characteristics (dB) | +2.1 | +2.6 |
| C/N rate (dB) | +2.8 | +2.9 |

It is seen from Table 6 that on comparison of the above results of Table 6 in conjunction with the results of Example 14 and 15, the output characteristics and the C/N ratio obtained when the angle of incidence of the vapor stream to the line normal to the non-magnetic base film is regulated to a range as defined by the present invention as in Example 20 or Comparative Example 21 are superior to those obtained with simple oblique vapor deposition.

Effects of Bombardment in Multilayered Structure

Figure 11:
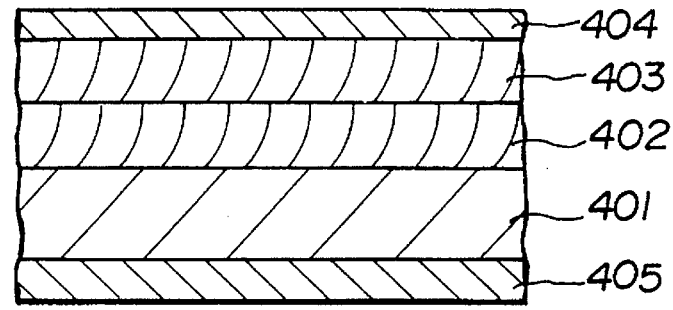
FIG. 11 is a schematic cross-sectional view showing a typical construction of a magnetic recording medium having, as a recording layer, stacked dual-layer magnetic metal thin films after bombardment.

With the magnetic tape of the present embodiment as shown in FIG. 11, a dual-layered magnetic layer consisting of a first magnetic thin film 40 and a second magnetic thin layer 403 is formed on one of the major surfaces of a non-magnetic base film 401 formed of polyethylene terephthalate.

On the major surface of the non-magnetic base film 401, a coating film of acrylate-based high molecular latex is formed as an undercoat for the first magnetic thin film 402, and the first magnetic thin film 402 is formed on the non-magnetic base film 401 via the undercoat film. Fine particles with a mean particle size of 400 Å are contained in the undercoat layer and are present at a rate of 10,000,000 particles per $mm^2$.

The first magnetic thin film 402 is formed on the undercoat film, and the second magnetic thin film 403 is formed on the first magnetic thin film 402. These magnetic thin films 402, 403 are deposited by the oblique vapor deposition method with the growth direction being the same forward direction. The magnetic thin films 402, 403 are each 1,000 Å in thickness.

The surface of the first magnetic thin film 402 is partially oxidized so that the film 401 is magnetically isolated from the second magnetic thin film 403 deposited thereon. The oxidized state of the surface of the first magnetic thin film 402 is realized by introducing an oxygen gas into an atmosphere of oblique vapor deposition.

The surface of the first magnetic thin film 402 is bombarded during vapor deposition as will be explained subsequently. This reduces the thickness of or eliminates the oxidized layer formed on the first magnetic thin film during the oblique vapor deposition to prevent deterioration of the electro-magnetic transducing characteristics of the magnetic layer otherwise caused by the oxidized layer.

On the other hand, an oxidized layer (50 Å) and a top coat layer 404 consisting of a carbon protective film (150 Å) and perfluoro polyether are formed on the second magnetic thin film 403.

A back coat layer 405 formed of carbon and urethane is formed on the opposite major surface of the non-magnetic base film 401.

The above-described magnetic tape may be produced by the following producing device.

Figure 12:
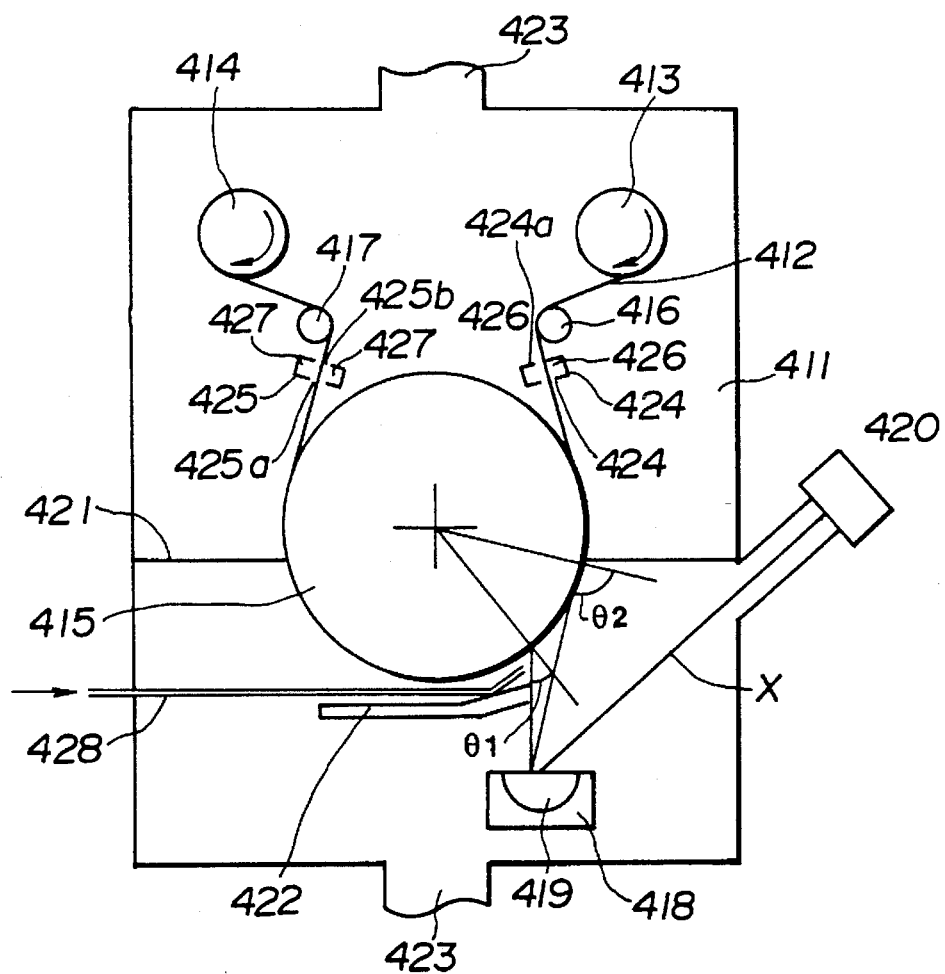
FIG. 12 is a schematic view showing an example of a production device employed for producing the magnetic recording medium shown in FIG. 11.
Figure 13:
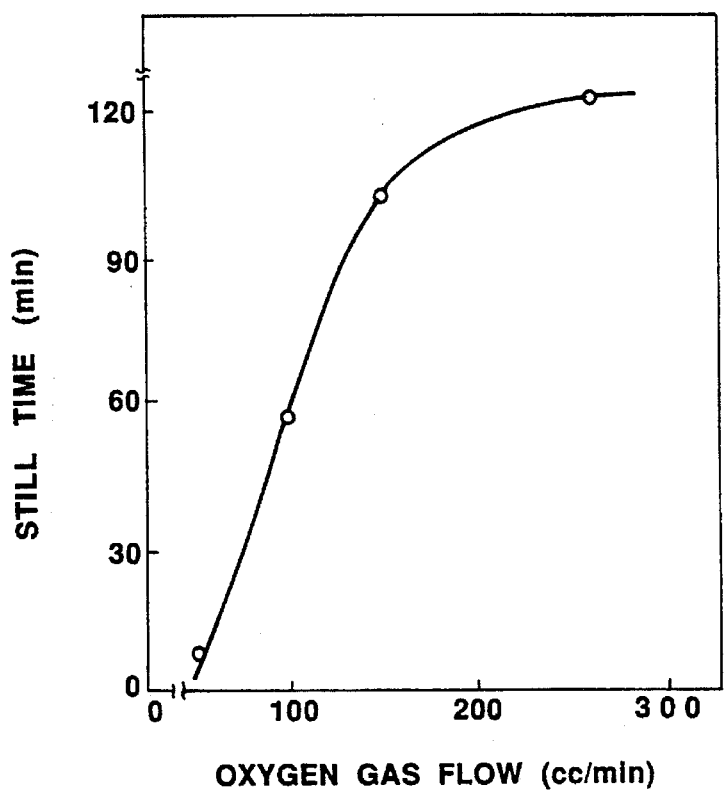
FIG. 13 is a graph showing the relation between the oxygen gas flow during vapor deposition and the still time of the magnetic layer produced by the vapor deposition.
Figure 14:
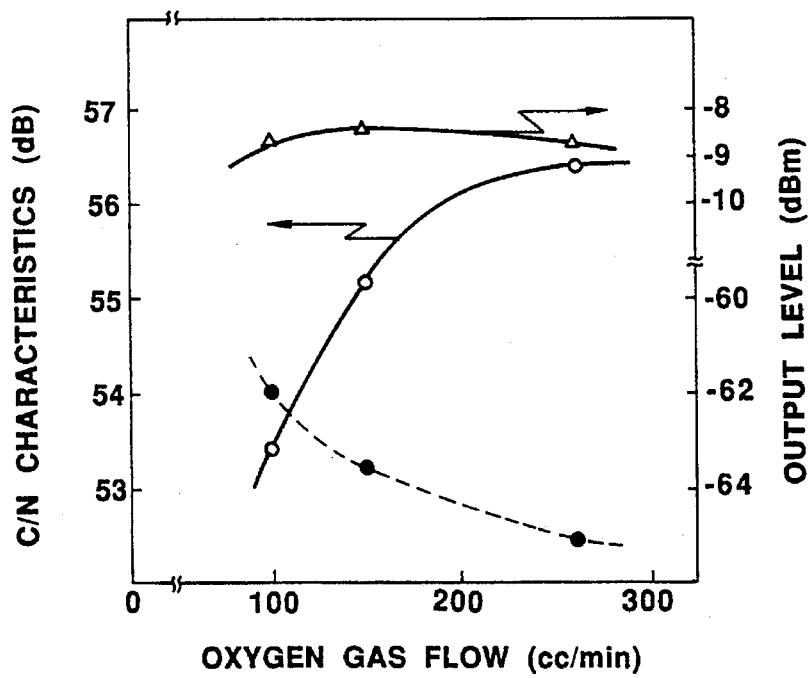
FIG. 14 is a graph showing the relation between the oxygen gas flow during vapor deposition and the output characteristics and C/N characteristics of the magnetic layer produced by he vapor deposition.

With the present producing device, a feed roll 413 adapted to be rotated counterclockwise at a constant velocity and a take-up roll 414 adapted to be rotated clockwise at a constant velocity are provided within a vacuum chamber 411 which is maintained at vacuum by being evacuated via upper and lower evacuation ports 423, as shown in FIG. 12. A tape-shaped non-magnetic base film 412 is adapted to travel from the feed roll 413 up to the take-up roll 413.

A cooling can 415 larger in diameter than the rolls 413, 414 is provided halfway on a travel path of the non-magnetic base film 412. The cooling can 415 is provided for pulling out the base film 412 downwards in the drawing, and is adapted for being rotated clockwise at a constant velocity. Meanwhile, the feed roll 413, take-up roll 414 and the cooling can 415 are in the form of cylinders each having the same height as that of the base film 412. A cooling unit not shown, is provided within the cooling can 415 for inhibiting deformation of the non-magnetic base film 412 due to rise in temperature.

Thus the non-magnetic base film 412 is adapted for being supplied from the feed roll 413 so as to travel around the periphery of the cooling can 415 until it is taken up by the take-up roll 414. Guide rolls 416, 417 are provided between the can feed roll 413 and the cooling can 415 and between the cooling can 415 and the take-up roll 414, respectively, for applying a predetermined tension to the non-magnetic base film 412 travelling between the feed roll 413 and the cooling can 415 and between the cooling can 415 and by the take-up roll 414, respectively, for allowing smooth running of the base film 412.

A crucible 418 is provided below the cooling can 415 within the vacuum chamber 411 and a magnetic metal material ($Co_{80}Ni_{20}$) 419 is charged in crucible 418. The crucible 418 is substantially equal in width to the cooling can 415.

On a lateral wall of the vacuum chamber 411 is mounted an electron gun 420 for heating and evaporating the magnetic metal material 419 charged in crucible 418. The electron gun 420 is provided at such a position that an electron beam X radiated from the electron gun 420 is radiated on the magnetic metal material 419 within crucible 418. The magnetic metal material 419 evaporated by the electron gun 420 is deposited as a magnetic layer on the non-magnetic base film 412 adapted to travel at a constant velocity around the peripheral surface of the cooling can 415.

A shutter 422 is provided in the vicinity of the cooling can 415 for extending along the peripheral surface of the cooling can. This results in the angle of incidence of the magnetic metal material 419 on the surface of the non-magnetic base film 412 being regulated because the surface of the base film 412 is partially covered by the shutter 422.

Consequently, as the magnetic metal material 419 charged in crucible 418 is heated and evaporated by the electron gun 419 so as to be deposited on the non-magnetic base film 415 travelling along the peripheral surface of the cooling can 415, deposition on the non-magnetic base film 412 of the evaporated magnetic metal material 419 is terminated at a region which is reached a time point when the non-magnetic base film 412 starts to be covered by one end of the shutter 422, that is a feed-out end of the on-magnetic base 412, with the angle of incidence $\theta_1$ of the magnetic metal material 419 evaporated at this time being a minimum angle of incidence with respect to the non-magnetic base film 412.

A partitioning plate 421 is provided within the vacuum chamber 411 for dividing the cooling can 415 into an upper portion and a lower portion. In this manner, deposition on the non-magnetic material 412 fed out from the feed roll 413 is started at a time point when the base film is passed by the partition plate 421, with the angle of incidence $\theta_2$ of the magnetic metal material 419 evaporated at this time point becoming a maximum angle of incidence with respect to the non-magnetic base film 412. Also, by providing such partitioning plate 421, dispersion of the evaporated magnetic metal material 419 to a space above the partition plate 421 is inhibited to improve the evaporation efficiency.

An oxygen gas inlet 428 is provided through the lateral wall of the vacuum chamber 411 for providing an oxygen gas during evaporation on the surface of the non-magnetic base film 412 via the inlet 428 onto the surface of the non-magnetic base film 412. This allows oxygen to be captured by the resulting magnetic thin film to improve magnetic characteristics.

Also, the present producing device is provided with processing units 424, 425 halfway between the guide rolls 416, 417 on the feed-out and take-up sides of the non-magnetic base film 412 and the cooling can 415, respectively.

These processing units 424, 425 are provided for bombarding the surface of the non-magnetic base film 412 and the surface of a magnetic thin film formed by oblique vapor deposition as described above, respectively. Before and after the deposition of the magnetic thin film, the magnetic tape having the non-magnetic base film 412 and the magnetic thin film formed thereon is adapted to pass through the inside of the processing units 424, 425, respectively, for carrying out bombardment on the surface of the non-magnetic base film 412 and that of the magnetic thin film.

Thus the non-magnetic base film 412 fed out from feed roll 413 is passed through the inside of the processing unit 424 to travel on the peripheral surface of the cooling can 415 and through the inside of the processing unit 425 so as to be taken up on the take-up roll 414.

The processing units 424, 425 are provided with inlets 424a, 425a and outlets 424b, 425b, for allowing passage of the non-magnetic base film 412 and the magnetic tape having the magnetic thin film formed thereon, respectively, so that the surface of the non-magnetic base film 412 and that of the magnetic tape having the magnetic thin film formed thereon are bombarded since a time point of entrance via the inlets 424a, 425a into the processing units 424, 425 until a time point of exit via the outlets 424b, 425b. Such bombardment operation results in reduction in thickness of elimination of the oxide layer formed on the non-magnetic base film 412 or the magnetic thin film produced by vapor deposition thereon to prevent deterioration in electro-magnetic transducing characteristics otherwise caused by the presence of the oxide layers.

Within the processing unit 424 (or 425), there are provided a pair of bar-shaped electrodes 426, 426 (or electrodes 427, 427) via non-magnetic base film 412 (or the magnetic tape), so that an electrical discharge is incurred between these electrodes 426, 426 (or electrodes 427, 427). These electrodes 426, 426 (or electrodes 427, 427) may be of the dc or ac type, as desired.

An inert gas containing or not containing a reducing gas is introduced into these processing units 424, 425 for water-cooling the electrodes 426, 426 (or electrodes 427, 427).

Meanwhile, with these processing units, bombardment is carried out not only on the surface of the magnetic thin film formed by the oblique deposition, but also on the surface of the non-magnetic base film 412. However, it suffices if at least the surface of the magnetic thin film is bombarded, while the bombardment of the surface of the non-magnetic base film 412 may be omitted.

Using the above-described producing device, a variety of magnetic tapes were produced in accordance with the following procedure.

EXAMPLE 22

An acrylate-based high molecular latex, having a mean particle size of 400 Å, was applied on one major surface of a polyethylene terephthalate film, having a thickness of 10 μm, to form an undercoat layer, at a rate of 1,000,000 particles per $mm^2$.

Using a $Co_{80}Ni_{20}$ alloy, wherein the subscripts denote the proportions of composition, as a magnetic metal material, a polyethylene terephthalate film, having the undercoat layer formed thereon, was run at a tape velocity of 30 m/sec, at the same time that an oxygen gas was introduced, by way of carrying out oblique vapor deposition on the polyethylene terephathalate film, for forming a first magnetic thin film on the polyethylene terephthalate film to a film thickness of 1,000 Å.

The amount of the oxygen gas introduced was set to 200 cc/min, while the angle of incidence of the evaporated magnetic metal material on the polyethylene terephthalate film surface was changed within the range of 45° and 90°.

In the course of the vapor deposition, the surface of the polyethylene terephthalate film and that of the produced first magnetic thin film were bombarded. The conditions of the bombardment included the voltage and the current of the electrodes in an Ar gas atmosphere on the polyethylene terephthalate film surface of 500 V and 0.2 Å, respectively, and the voltage and the current of the of the electrodes in an atmosphere containing 5% of an $H_2$ gas on the first magnetic thin film surface of 500 V and 0.3 Å, respectively.

After the polyethylene terephthalate film, taken up on the take-up roll, was again reeled out a second magnetic metal thin film was deposited to a film thickness of 1,000 Å, similarly to the first magnetic thin film, while the surface of the produced second magnetic thin film was bombarded. The same bombardment conditions as those for the polyethylene terephthalate film surface were employed.

After the vapor deposition, a back-coat layer composed of carbon and urethane and a top coat layer composed of perfluoro polyether were formed on the produced magnetic tape. Besides, the magnetic tape was cut to a width of 8 mm.

EXAMPLE 23

A magnetic tape was prepared in the same way as in Example 22, except that the Ar gas atmosphere containing 5% of an $H_2$ gas employed for the bombardment operations for the first magnetic thin film in Example 22 was replaced by an Ar gas atmosphere containing 4% of acetylene.

EXAMPLE 24

A magnetic tape was prepared in the same way as in Example 22 except that the voltage of 500 Å and the current of 0.3 Å employed for the bombardment of the first magnetic thin film were changed to the voltage of 500 V and the current of 0.05 Å, respectively.

EXAMPLE 25

A magnetic tape was prepared in the same way as in Example 22 except that the voltage of 500 Å and the current of 0.3 Å employed for the bombardment of the first magnetic thin film were changed to the voltage of 500 V and the current of 0.9 Å, respectively.

Comparative Example 12

A magnetic tape was prepared in the same way as in Example 22, except that the AF gas atmosphere containing 5% of an $H_2$ gas employed for the bombardment operations for the first magnetic thin film in Example 22 was replaced by an AF gas atmosphere not containing a reducing gas.

For each of these magnetic tapes, a playback output the C/N ratio and the error rate at a wavelength of 0.54 μm were measured, using a device EVS-900 manufactured by SONY CORPORATION. The results are shown in Table 7. It is noted that values of the constant K indicating the bombardment processing capability for the first magnetic thin films of the respective magnetic tapes (see formula (1) above) are also entered in Table 7.

TABLE 7

| | constant K for bombardment | playback output (dB) | C/N (dB) | error rate |
| --- | --- | --- | --- | --- |
| Ex. 22 | 39.4 | +1.2 | +2.1 | $7.6 \times 10^{-5}$ |
| Ex. 23 | 39.4 | +1.4 | +1.9 | $8.1 \times 10^{-5}$ |
| Ex. 24 | 6.56 | +0.3 | +0.5 | $7.8 \times 10^{-4}$ |
| Ex. 25 | 118.1 | +1.4 | +2.0 | $8.0 \times 10^{-5}$ |
| Comp. Ex. 12 | 26 | 0 | 0 | $2.9 \times 10^{-4}$ |

It is seen from Table 7 that in Examples 22 to 25, the playback output and the C/N ratio are higher and the error rate is lower than in Comparative Example. Consequently, superior durability and improved electro-magnetic transducing characteristics may be achieved by carrying out the bombardment operation during vapor deposition, as described above.

However, if the value of the constant K during the bombardment is small as in Example 24, it has not been possible to improve the playback output the C/N ratio of the error rate sufficiently. It may be said from this that the value of the constant K for the bombardment operation on the order of 10 or more is desirable.

Lubricating effects by Amine Salts of Perfluoro Polyester

The durability and the running performance under various conditions of use were checked of evaporated tapes in which a lubricating layer was formed on a carbon film formed on the surface of a magnetic layer using a perfluoro polyether derivative shown by the following Formulas 6 or 7:

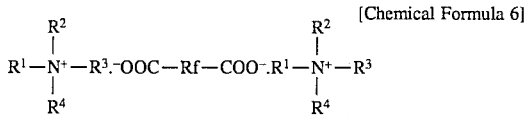

(where Rf denotes a perfluoro polyether chain and $R^1$, $R^2$, $R^2$ and $R^4$ each denote hydrogen or a hydrocarbon residue)

(where Rf denotes a perfluoro polyether chain and $R^1$, $R^2$, $R^3$ and $R^4$ each denote hydrogen or a hydrocarbon residue).

Experiment 1

The following magnetic recording media were prepared using 14 different types of perfluoro polyether derivatives (Compounds 1 to 14). It is noted that the main chains constituting the perfluoro polyether derivatives (compounds 1 to 14) employed in the present experiment that is the perfluoro polyether chains having terminal carboxylic group(s), the hydrocarbon groups or hydrogen contained in the polar group moiety, and the molecular weights, are as shown in Tables 8 and 9.

TABLE 8

| compound name | perfluoro polyether chains |
|---|---|
| compound 1 | $CF_2(OC_2F_4)_p(OCF_2)_qOCF_2$ |
| compound 2 | $CF_2(OC_2F_4)_p(OCF_2)_qOCF_2$ |
| compound 3 | $CF_2(OC_2F_4)_p(OCF_2)_qOCF_2$ |
| compound 4 | $CF_2(OC_2F_4)_p(OCF_2)_qOCF_2$ |
| compound 5 | $CF_2(OC_2F_4)_p(OCF_2)_qOCF_2$ |
| compound 6 | $CF_2(OC_2F_4)_p(OCF_2)_qOCF_2$ |
| compound 7 | $CF_2(OC_2F_4)_p(OCF_2)_qOCF_2$ |
| compound 8 | $F(CF_2CF_2CF_2O)_nCF_2CF_2$ |
| compound 9 | $F(CF_2CF_2CF_2O)_nCF_2CF_2$ |
| compound 10 | $F(CF_2CF_2CF_2O)_nCF_2CF_2$ |
| compound 11 | $F(CF_2CF_2CF_2O)_nCF_2CF_2$ |
| compound 12 | $CF_3(OCFCF_2)_m(OCF_2)_1$ $CF_3$ |
| compound 13 | $CF_3(OCFCF_2)_m(OCF_2)_1$ $CF_3$ |
| compound 14 | $CF_3(OCFCF_2)_m(OCF_2)_1$ $CF_3$ |

TABLE 9

| compound name | molecular weight | $R^1$ | $R^2$ | $R^3$ | $R^4$ |
|---|---|---|---|---|---|
| compound 1 | 2000 | $C_{18}H_{37}$ | H | H | H |
| compound 2 | 2000 | $C_{16}H_{33}$ | H | H | H |
| compound 3 | 2000 | $C_{14}H_{29}$ | H | H | H |
| compound 4 | 2000 | $C_{12}H_{25}$ | H | H | H |
| compound 5 | 2000 | $C_{18}H_{35}$ | H | H | H |
| compound 6 | 2000 | iso-$C_{18}H_{37}$ | H | H | H |
| compound 7 | 4000 | $C_{18}H_{31}$ | H | H | H |
| compound 8 | 3500 | $C_{18}H_{37}$ | $CH_3$ | $CH_3$ | H |
| compound 9 | 3500 | $C_6H_5$ (PHENYL) | H | H | H |
| compound 10 | 3500 | $C_{12}H_{25}$ | $CH_3$ | $CH_3$ | $CH_3$ |
| compound 11 | 3500 | $C_{24}H_{49}$ | H | H | H |
| compound 12 | 650 | $C_{18}H_{37}$ | H | H | H |
| compound 13 | 650 | $CH_2=CHC_{16}H_{32}$ | H | H | H |
| compound 14 | 650 | iso-$C_{18}H_{37}$ | H | H | H |

That is, Co was vapor-deposited by oblique vapor deposition on the surface of a polyethylene terephthalate film of 14 82 m in thickness for forming a magnetic metal thin film having a film thickness of 200 nm.

A protective film, comprising a carbon film, was deposited by sputtering on the surface of the magnetic metal thin film so that a total combined film thickness, including the thickness of the surface oxide layer of 5 nm, amounted to 20 nm.

A solution of the compounds 1 to 14 in a solvent mixture of Freon and ethanol was applied to the protective film so that a coating amount was equal to 5 mg/m² to form a lubricant layer. The magnetic tape thus obtained was cut to a width of 8 mm to produce sample tapes 1 to 14.

For each of the sample tapes 1 to 14, the friction coefficient still durability and shuttle durability under the conditions of the temperature of 25° C. and the humidity of 60%, the temperature of −5° C. and the temperature of 40° C. and the humidity of 80%, were measured. The results are shown in Tables 11 and 12.

For comparison, similar measurements were made of a magnetic tape having a carbon film formed thereon without holding a lubricant (Comparative Example 13), magnetic tapes making use of perfluoro polyether having a terminal carboxylic group or a perfluoro polyether having a terminal hydroxyl group, as shown in Table 10, as a lubricant (Comparative Examples 14 to 17) and a magnetic tape not having the carbon film formed thereon and having only a lubricant layer formed thereon (Comparative Example 18). The results are shown in Table 13.

TABLE 10

| | perfluoro polyethers |
|---|---|
| comp. Ex. 13 | — |
| comp. Ex. 14 | $HOOCCF_2(OC_2F_4)_p(OCF_2)_qOCF_2COOH$ |
| comp. Ex. 15 | $F(CF_2CF_2CF_2O)_nCF_2CF_2COOH$ |
| comp. Ex. 16 | $CF_3(OCFCF_2)_m(OCF_2)_1COOH$ $CF_3$ |
| comp. Ex. 17 | $HOCH_2CF_2(OC_2F_4)_p(OCF_2)_qOCF_2CH_2OH$ |
| comp. Ex. 18 | $HOOCCF_2(OC_2F_4)_p(OCF_2)_qOCF_2COOH$ |

TABLE 11

| sample table Nos. | conditions | frictional coefficient | still durability (min) | shuttle durability (number of times) |
|---|---|---|---|---|
| 1 | 25° C., 60 RH | 0.19 | >720 | >150 |
| | 40° C., 80 RH | 0.24 | >720 | >150 |
| | −5° C. | 0.20 | >720 | >150 |
| 2 | 25° C., 60 RH | 0.20 | >720 | >150 |
| | 40° C., 80 RH | 0.25 | >720 | >150 |
| | −5° C. | 0.20 | >720 | >150 |
| 3 | 25° C., 60 RH | 0.20 | >720 | >150 |
| | 40° C., 80 RH | 0.25 | >720 | >150 |
| | −5° C. | 0.21 | >720 | >150 |
| 4 | 25° C., 60 RH | 0.21 | >720 | >150 |
| | 40° C., 80 RH | 0.26 | >720 | >150 |
| | −5° C. | 0.21 | >720 | >150 |
| 5 | 25° C., 60 RH | 0.21 | >720 | >150 |
| | 40° C., 80 RH | 0.26 | >720 | >150 |
| | −5° C. | 0.22 | >720 | >150 |
| 6 | 25° C., 60 RH | 0.20 | >720 | >150 |
| | 40° C., 80 RH | 0.26 | >720 | >150 |
| | −5° C. | 0.22 | >720 | >150 |
| 7 | 25° C., 60 RH | 0.22 | >720 | >150 |
| | 40° C., 80 RH | 0.27 | >720 | >150 |
| | −5° C. | 0.22 | >720 | >150 |
| 8 | 25° C., 60 RH | 0.19 | >720 | >150 |
| | 40° C., 80 RH | 0.24 | >720 | >150 |
| | −5° C. | 0.19 | >720 | >150 |
| 9 | 25° C., 60 RH | 0.21 | >720 | >150 |
| | 40° C., 80 RH | 0.27 | >720 | >150 |
| | −5° C. | 0.23 | >720 | >150 |

TABLE 11-continued

| sample table Nos. | conditions | frictional coefficient | still durability (min) | shuttle durability (number of times) |
|---|---|---|---|---|
| 10 | 25° C., 60 RH | 0.19 | >720 | >150 |
|  | 40° C., 80 RH | 0.22 | >720 | >150 |
|  | −5° C. | 0.20 | >720 | >150 |

TABLE 12

| sample table Nos. | conditions | frictional coefficient | still durability (min) | shuttle durability (number of times) |
|---|---|---|---|---|
| 11 | 25° C., 60 RH | 0.17 | >720 | >150 |
|  | 40° C., 80 RH | 0.19 | >720 | >150 |
|  | −5° C. | 0.17 | >720 | >150 |
| 12 | 25° C., 60 RH | 0.21 | >720 | >150 |
|  | 40° C., 80 RH | 0.26 | >720 | >150 |
|  | −5° C. | 0.23 | >720 | >150 |
| 13 | 25° C., 60 RH | 0.22 | >720 | >150 |
|  | 40° C., 80 RH | 0.28 | >720 | >150 |
|  | −5° C. | 0.23 | >720 | >150 |
| 14 | 25° C., 60 RH | 0.23 | >720 | >150 |
|  | 40° C., 80 RH | 0.29 | >720 | >150 |
|  | −5° C. | 0.24 | >720 | >150 |

TABLE 13

|  | conditions | frictional coefficient | still durability (min) | shuttle durability (number of times) |
|---|---|---|---|---|
| comp. Ex. 1 | 25° C., 60 RH | 0.34 | >720 | 55 |
|  | 40° C., 80 RH | 0.54 | >720 | 25 |
|  | −5° C. | 0.39 | >720 | 41 |
| comp. Ex. 2 | 25° C., 60 RH | 0.24 | >720 | 125 |
|  | 40° C., 80 RH | 0.27 | 391 | 65 |
|  | −5° C. | 0.25 | 251 | 60 |
| comp. Ex. 3 | 25° C., 60 RH | 0.22 | >720 | 110 |
|  | 40° C., 80 RH | 0.23 | 376 | 57 |
|  | −5° C. | 0.22 | 129 | 48 |
| comp. Ex. 4 | 25° C., 60 RH | 0.24 | 395 | 92 |
|  | 40° C., 80 RH | 0.26 | 267 | 39 |
|  | −5° C. | 0.51 | 120 | 31 |
| comp. Ex. 5 | 25° C., 60 RH | 0.24 | 490 | 80 |
|  | 40° C., 80 RH | 0.26 | 267 | 48 |
|  | −5° C. | 0.25 | 120 | 41 |
| comp. Ex. 6 | 25° C., 60 RH | 0.24 | 135 | >150 |
|  | 40° C., 80 RH | 0.27 | 91 | 55 |
|  | −5° C. | 0.25 | 51 | 60 |

In Tables 11 to 13, still durability denotes the time involved until the output was decreased by −3 dB in a pause state. Shuttle durability denotes the number of shuttle operations involved until the output was decreased by 3 dB in case of shuttle running operations each continuing for two minutes.

It is seen from Tables 11 to 13 that low frictional coefficients, good running performance and high durability could be achieved in the case of employing an amine salt of perfluoro polyether having a terminal carboxylic group(s) as in the present Examples, rather than in the case of employing solely the perfluoro polyether having a terminal carboxylic group(s) or the hydroxyl group, as a lubricant.

It is also seen from comparison of the sample tapes 1 to 14 and the Comparative Example 18 that by forming a carbon film on the surface of a magnetic layer in addition to using the lubricant, highly satisfactory results could be achieved, with the frictional coefficients, still durability or shuttle durability not being deteriorated even under hostile environments including low temperatures or high temperature and high humidity.

Measurements were also made of the powder debris and decease in the shuttle output under the conditions of the temperature of 25° C. and the humidity of 60% for the sample tapes 1 to 14 and the Comparative Examples 13 to 18. The results are shown in Table 14. Meanwhile, the powder debris was evaluated by observing the surface of a magnetic layer by an optical microscope, while the decrease in the shuttle output was checked after 100 number of times of the shuttle running operations.

TABLE 14

|  | powder debris | decreased shuttle output (dB) |
|---|---|---|
| sample tape 1 | o | −0.5 |
| sample tape 2 | o | −0.6 |
| sample tape 3 | o | −0.8 |
| sample tape 4 | o | −0.4 |
| sample tape 5 | o | −0.6 |
| sample tape 6 | o | −0.9 |
| sample tape 7 | o | −0.7 |
| sample tape 8 | o | −0.5 |
| sample tape 9 | o | −0.7 |
| sample tape 10 | o | −0.0 |
| sample tape 11 | o | −0.6 |
| sample tape 12 | o | −0.5 |
| sample tape 13 | o | −0.6 |
| sample tape 14 | o | −0.7 |
| comp. Ex. 13 | x | −5.3 |
| comp. Ex. 14 | x | −3.2 |
| comp. Ex. 15 | x | −3.8 |
| comp. Ex. 16 | x | −3.1 |
| comp. Ex. 17 | x | −2.9 |
| comp. Ex. 18 | x | −3.1 |

It is seen from Table 14 that with sample tapes 1 to 14, powder debris and decrease in the output occurred only to a lesser extent.

Experiment 2

On the surface of a polyethylene terephthalate base film 10 μm in thickness, a dispersion of a mixture of a binder component consisting essentially of an acrylate and $SiO_2$ particles having a mean particle size of 18 nm in isopropyl alcohol as solvent was coated so that the density of the $SiO_2$ particles amounted to 10,000,000/mm² to form surface protrusions.

An alloy of $Co_{80}Ni_{20}$, where the subscripts denote weight percent was charged into a crucible disposed within a vacuum chamber, and oblique vapor deposition was carried out as conventionally for depositing the magnetic material vaporized from the crucible on the surface of the running base film for forming a thin magnetic metal film thereon. An oxygen gas was introduced onto the surface of the base film at a rate of 300 cc/min. The angle of incidence of the magnetic material on the base film surface was set so as to be changed in a range of 40° to 90° relative to the base film surface. The running speed of the base film was adjusted so that the film thickness of the produced thin magnetic metal film amounted to 200 nm.

A back coating layer consisting essentially of urethane and carbon was formed on the opposite surface of the base film, that is its surface opposite to the base film surface on which the thin magnetic metal film was formed.

Then, using a continuous take-up type sputtering device, dc magnet ton sputtering was carried out in an Ar gas atmosphere for depositing a carbon film on the surface of the thin magnetic metal film surface. During sputtering, the vacuum was set to 2 Pa, while the tape feed rate was adjusted so that the thickness of the carbon film amounted to 20 nm. A square-shaped target of 200 mm in width and 150 mm in length was employed, and a distance between the target and the substrate of the magnetic tape was set to 50 mm. The magnetic tape was cut to width of 8 mm and the cut tape segments were immersed in lubricants, obtained by dissolving compound A and B shown in Table 15 in Freon 113 each at a concentration of 0.06 wt %, at a rate of 1 m/min, for forming a lubricant layer on the surface of the carbon film, for producing sample tapes 15 and 16.

TABLE 15

| lubricants | structural formula |
| --- | --- |
| compound A | $H_{37}C_{18}H_3N^+ \cdot O^-OCCF_2O(CF_2O)_n(C_2F_4O)_mCF_2COO^- \cdot {}^+NH_3C_{18}H_{37}$ |
| compound B | $F(CF_2CF_2CF_2O)_nCF_2CF_2COO^- \cdot {}^+NH_3C_{18}H_{37}$ |
| compound C | $F(CF_2CF_2CF_2O)_nCF_2CF_2COO^- \cdot {}^+NH_3C_{18}H_{37}$ |
| compound D | $F(CF_2CF_2CF_2O)_nCF_2CF_2COO^- \cdot {}^+NH(CH_3)_2C_{18}H_{37}$ |

Of the sample tapes 15 and 16, prepared in this manner, shuttle durability, shuttle durability and partial proceeding wear were checked. The results are shown in Table 16. Still durability was checked by still-running the sample tapes at ambient temperature and humidity until two hours have elapsed, using a remodelled version of a video deck manufactured by SONY CORPORATION under a trade name of EV-Si, and checking the time which elapsed until the output was decreased by −3 dB. Shuttle durability was evaluated in terms of a decrease in the output after 100 passes with respect to the output after 1 pass at an ambient temperature and humidity using the video deck manufactured by SONY CORPORATION under the trade name of EV-S1. This shuttle durability is represented by the following equation (2):

$$\text{shuttle durability}(dB) = 210 \text{ g} \frac{\text{(output after 100 passes)}}{\text{(output after 1 pass)}} \quad (2)$$

On the other hand, partial proceeding wear was evaluated by observing step differences produced on forming interference fringes by an optical microscope.

TABLE 16

| | lubricant | still durability (min) | shuttle durability (dB) | partially proceeding wear |
| --- | --- | --- | --- | --- |
| sample tape 15 | compound A | >1400 | 0 | ○ |
| sample tape 16 | compound B | 20–30 | −2 | △ |

It is seen from Table 16 that by using an amine salt of perfluoro polyether having a carboxylic group at one or both terminals as a lubricant partially proceeding wear could be diminished in either cases, so that satisfactory durability could be achieved.

Experiment 3

On the surface of a polyethylene terephthalate film, having a thickness of 10 μm, $Co_{80}Ni_{20}$, wherein subscripts denote wt % values, was deposited by vacuum deposition to form a thin magnetic metal film. An oxygen gas was introduced onto the base film surface at a rate of 2500 cc/min, and the angle of incidence of the magnetic material relative to the base film surface was set to 45°.

Sputtering was then carried out in an Ar gas atmosphere for depositing a carbon film on the thin magnetic metal film surface to a film thickness of 20 nm. During sputtering, the Ar gas flow rate was set to 300 SCCM, while the feed rate of the magnetic tape was set to 1 m/min.

The magnetic tape was immersed in lubricants, obtained by dissolving compounds C and D shown in Table 9 in Freon 113 each at a concentration of 0.06 wt %, at a rate of 1 m/min, for forming a lubricant layer on the surface of the carbon film, for producing sample tapes 17 and 18.

of these sample tapes 17 and 18, prepared in this manner, still durability, shuttle durability, surface roughness and powder debris were checked. The results are shown in Table 17. Still durability was checked by still-running the sample tapes using a video deck manufactured by SONY CORPORATION under a trade name of EV-Si and checking the time which elapsed until the output was decreased by −3 dB. Shuttle durability was evaluated in terms of a decrease in the output after 100 passes of shuttle running operations, each continuing for two minutes, using the video deck manufactured by SONY CORPORATION under the trade name of EV-S1. Surface roughness was measured using a talistep with a needle pressure of 2 mg/mm$^2$, while powder debris was evaluated by observing the magnetic head surface by an optical microscope (magnification factor: 100) after using the sample tapes 17 and 18 kept in sliding contact with the magnetic head.

For comparison, a magnetic tape in which a commercial perfluoro polyether (trade name: Z-DOL) was used in place of the compound C (or compound D) was checked in a similar manner. The results are also shown in Table 17.

TABLE 17

| | lubricant | still durability (hrs) | shuttle durability (dB) | surface roughness (Å) | powder debris |
| --- | --- | --- | --- | --- | --- |
| sample tape 17 | compound C | 20 | +0.3 | 20 | |
| sample tape 18 | compound D | 15 | −0.1 | 20 | ○ |
| comp. Ex. 19 | Z-DOL | 2 | −4.8 | 20 | x |

It has been found that excellent durability and only insignificant powder debris may be achieved by employing amine salt compounds of perfluoro polyether, having terminal carboxylic group(s), as a lubricant as shown in Table 17.

Thus, the effects on Various properties caused by changes in the molecular weights of the perfluoro polyether derivatives employed as a lubricant were checked.

Experiment 4

Sample tapes 19 to 22 were prepared by sequentially stacking a magnetic metal thin film and a carbon film on a base film similarly to the above Experiment 3 and subsequently forming a lubricant layer on the carbon film surface using a variety of perfluoro polyether derivatives having different molecular weights under conditions similar to those employed in Experiment 3. Meanwhile, the perfluoro polyether derivatives employed in the present experiment had molecular weights as shown in Table 18.

The shuttle durability, surface roughness and the frictional coefficient of the sample tapes 19 to 22 were measured similarly to Experiment 3. The results are also shown in Table 18.

TABLE 18

|  | molecular weight | shuttle durability(db) | surface roughness(Å) | powder debris | fictional coefficient |
|---|---|---|---|---|---|
| sample tape 19 | 1400 | +0.4 | 20 | ⊚ | 0.20 |
| sample tape 20 | 2500 | −0.5 | 20 | o | 0.19 |
| sample tape 21 | 3500 | −1.0 | 20 | o | 0.21 |
| sample tape 22 | 4500 | −1.2 | 20 | o | 0.22 |
| comp. Ex. 20 | 1000 | −2.5 | 20 | x | 0.27 |
| comp. Ex. 21 | 5000 | −3.5 | 20 | x | 0.29 |

As shown in Table 18, the frictional coefficient could be suppressed sufficiently, while excellent durability could be achieved and powder debris could be prevented from being incurred when the molecular weight of the perfluoro polyether derivative employed as a lubricant was in a range of from 1400 to 4500. Conversely, if the molecular weight of the perfluoro polyether derivative was lesser than the above range (Comparative Example 20) or larger than the above range (Comparative Example 21), the decrease in the output after repeated running was predominant, while powder debris was increased.

The relation bet ween various properties and the molecular weight s of polar group moiety of the above-mentioned perfluoro polyether derivatives was then investigated.

Experiment 5

Sample tapes 23 to 25 were prepared by sequentially stacking a magnetic metal thin film and a carbon film on a base film similarly to the above Experiment 2 and subsequently forming a lubricant layer on the carbon film surface using three different perfluoro polyether derivatives having different polar groups under the same conditions as those of Experiment 2. Meanwhile, the perfluoro polyether derivatives had polar groups on both terminals, while the structure and the molecular weight of the polar group moieties had the structure and the molecular weight as shown in Table 19.

The shuttle durability and partially advancing wear of the sample tapes 23 to 25 were measured similarly to Experiment 2. The results are shown in Table 12. In the present Experiment, a remodelled video deck manufactured by SONY CORPORATION under the trade name of EV-S1 was employed for conducting e shuttle durability test in the present Experiment.

For comparison, measurements were also made of the cases of employing perfluoro polyether derivative having the molecular weight of the polar group moiety exceeding 120 (Comparative Examples 22 and 23). The results are also shown in Table 19.

TABLE 19

|  | structure of polar group moiety | molecular weight | shuttle durability (dB) | partially proceeding wear |
|---|---|---|---|---|
| sample tape 23 | —COONH$_2$(CH$_3$) | 75 | −0.5 | o |
| sample tape 24 | —COONH(CH$_3$)$_2$ | 89 | −0.4 | o |
| sample tape 25 | —COONH(C$_2$H$_5$)$_2$ | 117 | −0.7 | Δ |
| comp. Ex. 22 | —COONH(C$_3$H$_7$)$_2$ | 145 | −1.4 | x |
| comp. Ex. 23 | —COON(C$_3$H$_7$)$_3$ | 187 | −1.8 | xx |

The tendency is noticed that the larger the molecular weight of the polar group moieties, the more pronounced is the deterioration in the output after repeated running, as shown in Table 19. Similar results have been obtained with partially advancing wear. It is seen from this that the molecular weight of the polar group moiety needs to be lower than 120 for assuring satisfactory durability.

Scrutinies into Surface Properties of Reverse Surface of non-magnetic Base film

A vacuum deposition device for producing a magnetic recording medium of the present embodiment is hereinafter explained.

Figure 15:
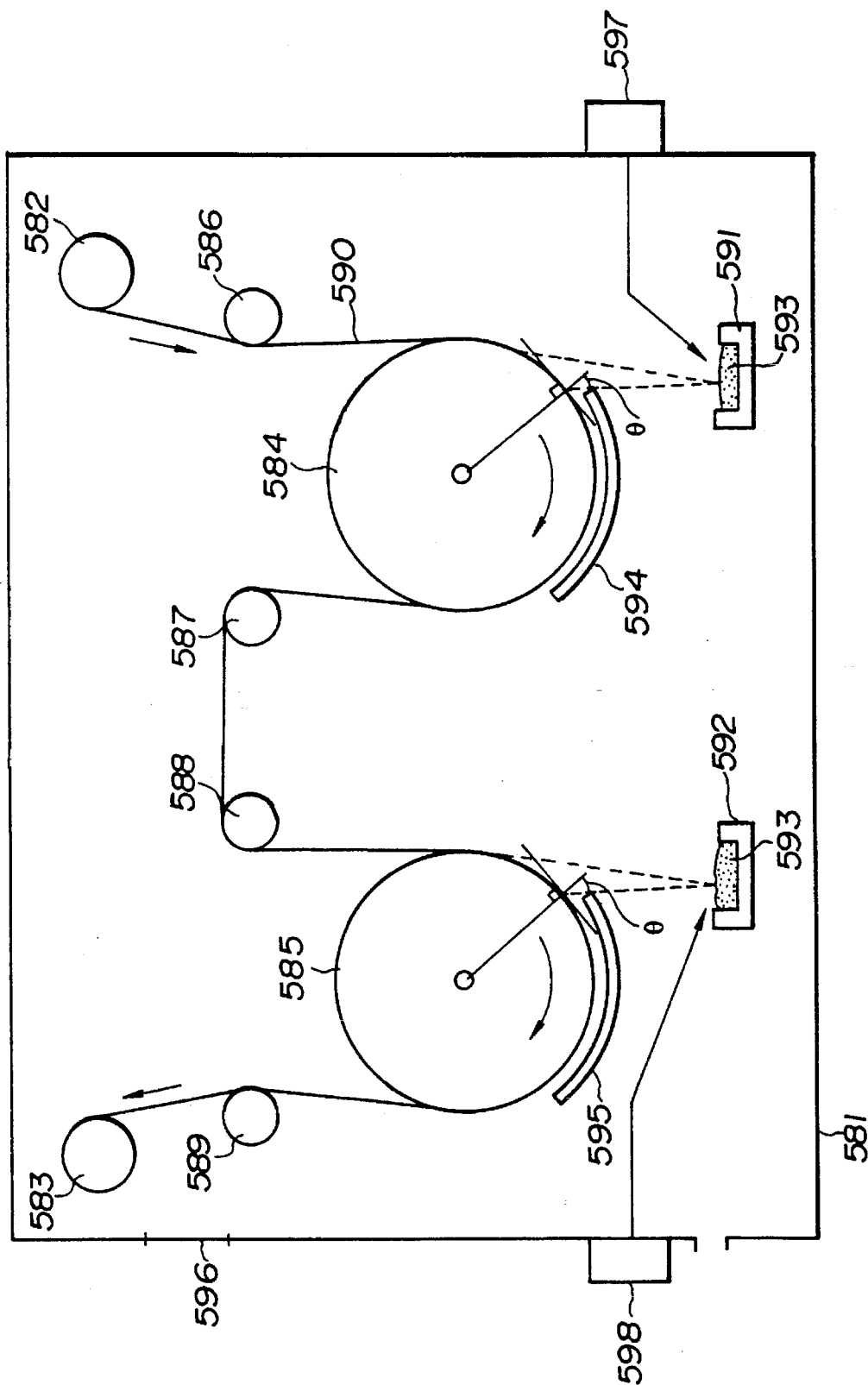
FIG. 15 is a schematic view showing a typical construction of a producing device for producing a magnetic recording medium having a dual magnetic layer.

This vacuum deposition device is employed for forming a magnetic layer by vacuum deposition of two magnetic metal thin films, and includes a feed-out roll 583 and a take-up roll 583 at the upper left and right sides within a vacuum chamber 581, the internal region of which is maintained at a reduced pressure, and first and second cooling cans 584 and 585 at the central left and right sides of the vacuum chamber 581, as shown in FIG. 15. A guide roll 586 is provided between the feed-out roll 582 and the cooling can 584, while guide rolls 587, 588 are provided between the cooling cans 584 and 585 and a guide roll 589 is provided between the cooling can 585 and the take-up roll 583.

The first cooling can 584 is mounted for reeling out the flexible supporting base film 590, wound about the feed-out roll 582, downwards in the drawing, while the second cooling can 585 is provided at the same height as the cooling can 584. The cooling cans 584, 585 are larger in diameter than the feed-out roll 582 or take-up roll 583. The feed-out roll 582, take-up roll 583 and the cooling cans 584, 585 are in the form of cylinders each having a width substantially equal to that of the flexible supporting base film 590. The cooling cans 584, 585 are provided with internal cooling means, not shown, for preventing the flexible supporting base film from being deformed due to rise in temperature.

The guide rolls 586, 589 are provided between the feed-out roll 582 and the cooling can 584 and between the cooling can 585 and the take-up roll 583, respectively, while the other guide rolls 587, 588 are provided at a height above and between the first cooling can 584 and the second cooling can 585, respectively. Thus the guide roll 586, 587, 588 and 589 apply a predetermined tension to the flexible supporting base film 590, which is being supplied from the feed-out roll 582 to the first cooling can 584 and thence to the second cooling can 585 so as to be taken up from the second cooling can 585 on the take-up roll 583, so as to permit the flexible supporting base film 590 to be run positively on the peripheral surfaces of the cooling cans 584, 585.

A pair of crucibles 591, 592, filled with a magnetic metal material, are provided below the cooling cans 584, 585. A shutter 594, curved to conform to the peripheral surface of the cooling can 584, is provided in the vicinity of the cooling can 584 intermediate between the first cooling can 584 and the crucible 591 filled with the magnetic metal material 593. Similarly, another shutter 595 is mounted in association with the second cooling can 585. A monitoring window 596 is provided in a wall surface of the vacuum chamber 581 laterally of the cooling can 585, while heating units 597, 598 are provided outside of the vacuum chamber 581.

In the above-described vacuum deposition device, the flexible supporting base film 590, wound around the feed-out roll 582, is supplied from the feed-out roll 582, rotated counterclockwise at a constant speed, to the first cooling can 584, rotated clockwise at a constant speed, while the base film is tensioned by guide roll 586. The base film is then guided upwards in the drawing so as to be run around the guide roll 588, while being tensioned by the guide roll 587. The flexible supporting base film is then supplied from guide roll 588 to the second cooling can 585, rotated clockwise at a constant speed, so as to be taken up by take-up roll 583, rotated clockwise at a constant speed, while being tensioned by guide roll 589.

Vapor deposition is performed on the non-magnetic base film 590 as it is run along the peripheral surfaces of the first cooling can 584 and the second cooling can 585.

Specifically, the aforementioned crucible 591 filled with the magnetic metal material 593 is provided below the first cooling can 584 within the vacuum chamber shown in FIG. 15, and has a width equal to that of the first cooling can 584. The magnetic metal material 593 charged into the crucible 591 is heated and evaporated by heating unit 597 provided externally of the vacuum chamber 581. The magnetic metal material 593, evaporated by the heating unit 597, is deposited as a first magnetic metal thin film on the flexible supporting base film 590 which is run at a constant speed around the peripheral surface of the cooling can 584.

The flexible supporting base film 590, having the first magnetic metal thin film deposited thereon, is guided upwards in the drawing by guide roll 587 and thence to guide roll 588 so as to be supplied to the second cooling can 585. The second cooling can 585 is associated with the crucible 592 similarly to the first cooling can 584. The magnetic metal material 593, charged in the crucible 592, is heated and evaporated by the heating unit 598 provided externally of the vacuum chamber 581. Thus the magnetic metal material 593, evaporated by the heating unit 598, is deposited as a second magnetic metal thin film on the flexible supporting base film 590, having the first magnetic metal thin film deposited thereon and which is run at a constant speed around the peripheral surface of the cooling can 585.

It is noted that, since the aforementioned shutters 594, 595 are provided to cover predetermined portions of the cooling cans 584, 585, respectively, the magnetic metal material 593 is allowed to be deposited within a range covered by a predetermined angle θ to form the first and second magnetic metal thin films.

Figure 16:
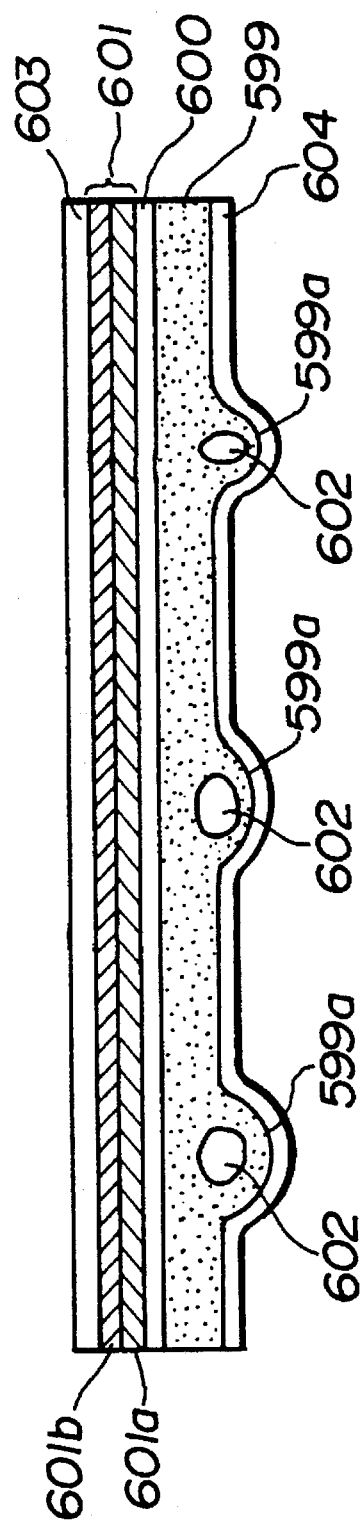
FIG. 16 is a schematic cross-sectional view showing a typical construction of a magnetic recording medium having its reverse surface controlled in surface roughness.

The magnetic recording medium, prepared by the above-described device, has a structure as shown in FIG. 16, in which a first magnetic metal thin film 601a and a second magnetic metal thin film 601b, making up a magnetic layer 601, are formed on one of the major surfaces of a flexible supporting base film 599 formed e.g. of polyethylene terephthalate.

A first undercoat layer 600 is coated on the major surface of the flexible supporting base film 599, with the first magnetic metal thin film 601a being formed via the undercoat layer 600 on the flexible supporting base film 599. The opposite major surface of the flexible supporting base film 599 is formed with numerous protrusions 599a caused by the presence of fillers 602. A protective film 603 is formed on the magnetic layer 601, while a backcoat 604 is formed on the opposite major surface of the flexible supporting base film 599.

Using the above-described vacuum deposition device, a variety of magnetic tapes, each having a magnetic layer constituted by the above-described two magnetic metal thin films, were prepared.

The undercoat films, magnetic films, back coats and the top coats were formed on polyethylene flexible supporting base films, each being 10 μm in thickness and having an extremely smooth major surface (evaporated surface) and the other major surface (running surface) presenting variable roughnesses, by way of preparing magnetic tapes of Comparative Examples 24 to 27 and Examples 26 to 28.

The same conditions were used for preparing the undercoat films, that is, an acrylate based emulsion, having a mean particle size of 250 Å, was coated at a rate of 1,000,000 particles per $mm^2$ on the evaporated surface, for forming each undercoat layer.

The same vapor deposition conditions were used, that is, the same $Co_{95}$—$Ni_5$, where subscripted numbers stand for wt % values, was used, while the amount of introduced oxygen, the temperature for the first and second cooling cans, the incident angle and the tape speed were set to 200 cc/min, −20° C., 45° to 90° and to 18 m/min, respectively. The magnetic layer was formed with the thicknesses of the first and second magnetic metal thin films both being set to 1000 Å.

After vapor deposition of the magnetic layer, a back coat composed mainly of a carbon pigment and an urethane-based binder was applied, and the resulting product was processed with H/P at 150° C. for 0.3 sec and top coating and cut to predetermined tape widths to prepare magnetic tapes of the Comparative Examples 24 to 27 and Examples 26 to 28.

The number of the occurrences of thermal degradations, surface roughness of the magnetic layer, energy products and the error rate of these sample tapes during preparation thereof were measured. The number of occurrences of thermal degradations was checked by visual observation through the monitoring window 516 shown in FIG. 15 directly after initial formation of a coil of the second magnetic metal thin film on the peripheral surface of the second cooling can, and represents the number encountered in the course of preparation of a 1000 m length of each of the sample tapes of the Comparative Examples 24 to 27 and Examples 26 to 28.

The surface roughnesses were measured for a scan length of 0.5 mm using a talistep prepared by Lank Taylor Bobson Inc. and a trapezoidal needle having a needle diameter of 0.2×0.2 μm. The energy product was found as a product of the residual magnetic flux density $B_r$, saturation magnetization δ and coercivity $H_c$. The results are shown in Table 20.

TABLE 20

|  |  | surface roughness of running surface (μm) | | number of occurrences of thermal deterioration | surface roughness of magnetic layer (μm) | energy product (G cm Oe) | error rate |
| --- | --- | --- | --- | --- | --- | --- | --- |
|  |  | $R_a$ | $R_{max}$ |  |  |  |  |
| comp. Ex. | 24 | 0.0065 | 0.078 | 7 | 0.0025 | 102 | $1.8 \times 10^{-4}$ |
|  | 25 | 0.0073 | 0.068 | 8 | 0.0029 | 105 | $2.1 \times 10^{-4}$ |
|  | 26 | 0.0012 | 0.002 | — | — | — |  |
|  | 27 | 0.0016 | 0.014 | — | — | — |  |
| Ex. | 26 | 0.0063 | 0.065 | 0 | 0.0020 | 110 | $7.8 \times 10^{-5}$ |
|  | 27 | 0.0046 | 0.034 | 0 | 0.0015 | 111 | $6.5 \times 10^{-5}$ |
|  | 28 | 0.0052 | 0.042 | 0 | 0.0018 | 108 | $6.8 \times 10^{-5}$ |

It is seen from Table 20 that with the Examples 26 to 28 in which the centerline mean roughness $R_a$ and maximum height of the projections $R_{max}$, as measured of the roughness of the running surface of the flexible supporting base film, are within the ranges of the present invention, as contrasted to Comparative Examples 24 too 27 in which $R_a$ or $R_{max}$ are outside the range of the present invention. Besides, thermal degradation and hence the roughness of the magnetic layer side of the sample tapes are suppressed to assure a smooth surface of the magnetic layer, and both the energy product and error rate are improved. With the Comparative Examples 26 and 27, wrinkles were produced on the surface during tape running along the cooling can to render it impossible to make measurements of the parameters in their entirety.

Meanwhile, the above-given definition of the surface roughness of the reverse surface may advantageously be employed for the cases in which the protective layer is formed via an oxide layer or a bombardment operation is carried out as in the preceding Examples.

Constitution of Recording/Reproducing Apparatus

The magnetic recording medium of each of the previous embodiments may be employed advantageously as a recording medium for a digital VTR.

The digital VTR is used for recording digitized color video signals on a recording medium, such as a magnetic tape. The component type digital VTR of a D1 format for broadcasting stations and a composite type digital VTR of a D2 format have been put to practical use.

With the former type D1 format digital VTR, luminance signal and first and second chrominance signals are processed by analog/digital conversion at the sampling frequencies of 13.5 MHz and 6.75 MHz, respectively, followed by predetermined signal processing, and the resulting signal are recorded on a magnetic tape. The D1 format digital VTR system is also termed a 4:2:2 system in that the sampling frequencies of these signal components bear a ratio of 4:2:2.

With the later D2 format digital VTR, the composite color video signals are sampled by signals having a frequency four times that of the color subcarrier signals and processed with analog/digital conversion and predetermined signal processing before being recorded on a magnetic tape.

At any rate, since these digital VTRs are designed on the premises that they are destined for being used at the broadcasting stations, special emphasis is placed on the picture quality and digital color signals converted by A/D at a rate of 8 bits per sample are recorded without substantial data compression.

Consequently, with e.g. the D1 format digital VTR, the playback time of 1.5 hour at most may be achieved when using a large-sized cassette tape, so that it cannot be suitably employed as a VTR for general household application.

Thus, in the above-described embodiment of the digital VTR, signals having a minimum wavelength of 0.5 μm are recorded for e.g. a track width of 5 μm for realizing a recording density of $8 \times 10^5$ bits/mm². Besides, a data compression system of compressing the recording data in a manner free from playback distortion is simultaneously employed for enabling a narrow tape with a tape width of 8 mm or less to be used for recording/playback continuing for an extended period of time. The arrangement of this digital VTR is hereinafter explained.

a. Signal processing Unit

First the signal processing unit of the digital VTR employed in the present embodiment is explained.

Figure 17:
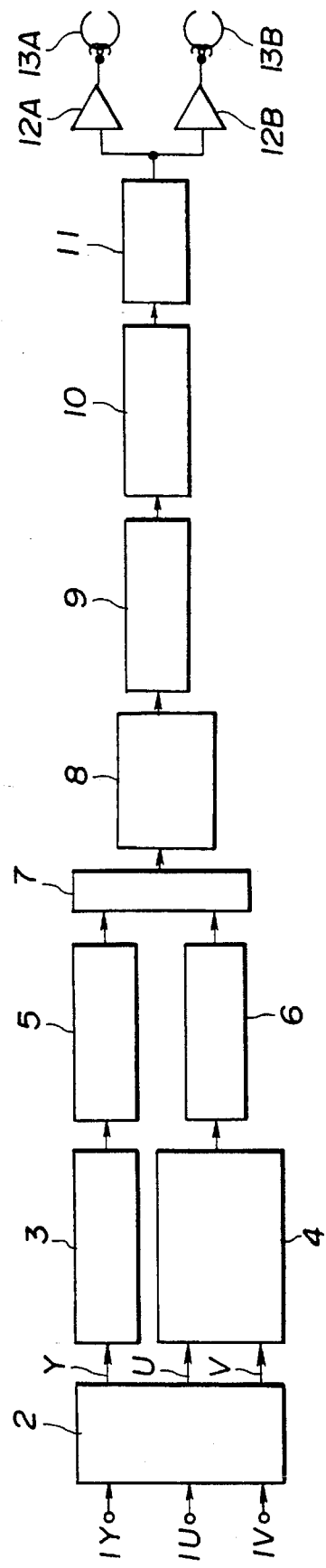
FIG. 17 is a block diagram showing an arrangement of a recording side of a signal processor of a digital VTR for repression recording of digital video signals in a manner as free from playback distortion as possible.

FIG. 17 shows an arrangement of the recording side in its entirety. Digital luminance signals Y and digital color difference signals U, V, prepared from three color signals R, G and B of a color video camera, are supplied to input terminals Y, IU and IV. The clock rates of the respective signals are selected to be equal to the frequencies of the component signals of the D1 format. That is, the sampling frequencies are set to 13.5 MHz and 6.75 MHz, with the number of bits per sample being 8. Thus the data volume of the signals supplied to the input terminals IY, IU and IV is approximately 216 Mbps. These signals are compressed to a data volume of approximately 167 Mbps by being passed through an effective data extracting circuit 2 adapted to for eliminating blanking data from the signals.

Among the outputs of the effective data extracting circuit 2, the luminance signals Y are supplied to a frequency converter 3 where the sampling frequency is reduced to three fourths of 13.5 MHz. A sub-sampling filter, for example, is used as the frequency converter 3 to prevent aliasing distortion. An output signal from the frequency converter 3 is supplied to a block-forming circuit 5 where the sequence of the luminance data is changed in a block sequence. The block-forming circuit 5 is provided for a downstream block-forming and encoding circuit 8.

Figure 19:
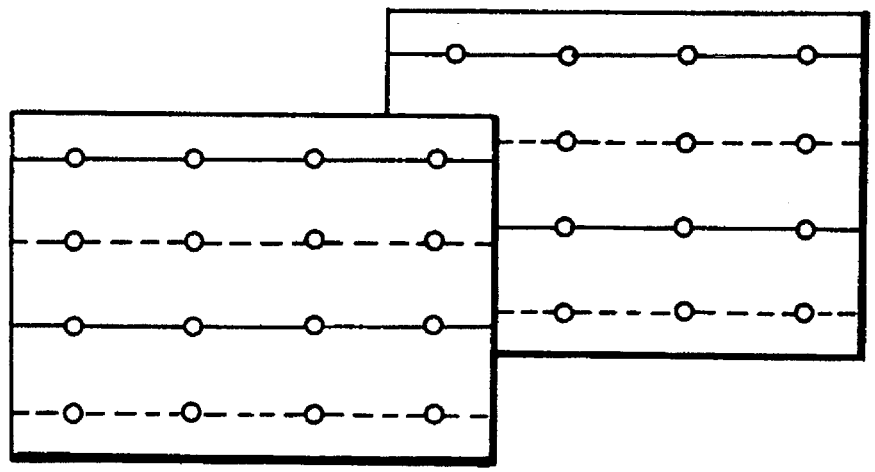
FIG. 19 is a schematic view showing an example of a block for block encoding.

FIG. 19 shows a structure of a block as an encoding unit. The example shown refers to a three-dimensional block. That is, a number of unit blocks each consisting of 4 lines×4 pixels×2 frames as shown in FIG. 19 are formed by dividing a picture across two frames. In FIG. 19, a solid line and a broken line indicate horizontal scanning lines for an odd-numbered field and even-numbered field, respectively.

Among the outputs of the effective data extracting circuit 2, the two color difference signals U and V are supplied to a sub-sampling and sub-line circuit 4 where the sampling frequency is halved from 6.75 MHz and subsequently the two digital color difference signals are alternately selected from line to line so as to be synthesized to a 1-channel data. Consequently, line-sequential digital color difference signals are produced from the sub-sampling and sub-line circuit 4.

Figure 20:
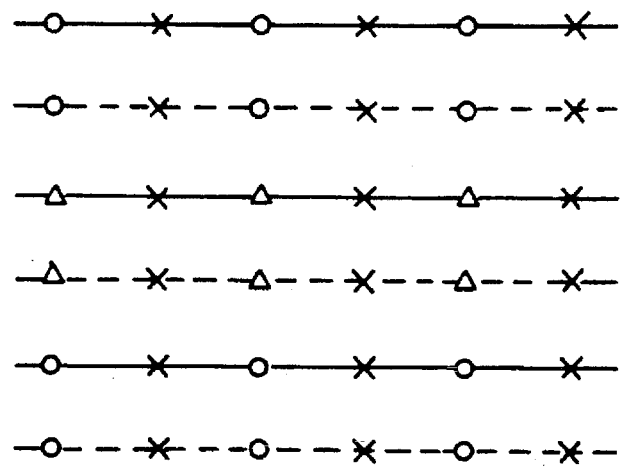
FIG. 20 is a schematic view for illustrating sub-sampling and sub-lining.

FIG. 20 shows a pixel array of signal s sub-sampled and sub-lined by the sub-sampling and sub-line circuit 4. In FIG. 20, o, Δ and × denote sub-sampled pixels of the first color difference signals U, sub-sampled pixels of the second color difference signals V and the positions of the pixels eliminated by sub-sampling, respectively.

The line-sequential output signals from the sub-sampling and sub-lining circuit 4 are supplied to a block-forming circuit 6. Similarly to the block-forming circuit 5, the block-forming circuit 6 converts the color difference data in the television signal scanning sequence converted into block sequence data. Similarly to the block-forming circuit 5, the block-forming circuit 6 converts the color difference data into data having a block structure of 4 lines×4 pixels×2 frames. Output signals of the block-forming circuits 5 and 6 are supplied to a synthesis circuit 7.

In the synthesis circuit 7, the luminance signals and color difference signals, converted into block sequence data, are converted into one-channel data, which is supplied to a block-forming encoding circuit 8. The block-forming encoding circuit 8 may for example be an adaptive block-by-block dynamic range coding, (ADRC) circuit as later explained, or a discrete cosine transform (DCT) circuit. An output signal from the block-forming encoding circuit 8 is supplied to a frame-forming circuit 9 where the signal is converted into frame data. The frame-forming circuit 9 provides for switching from clocks for an pixel system to clocks for a recording system.

An output signal of the frame-forming circuit 9 is supplied to a circuit 10 for generating parities as error correction code data. An output signal of the parity generating circuit 10 is supplied to a channel encoder 11 where channel encoding is performed for reducing low-frequency components of the recording data. An output signal of channel encoder 11 is supplied to each of the recording amplifiers 12A and 12B and to a rotary transformer, not shown, and thence to a pair of magnetic heads 13A, 13B for recording on a magnetic tape. It is noted that audio signals and video signals are compression-encoded separately and supplied to channel encoder 11.

By extracting only the effective scanning periods of the input data, the input data volume of 26 Mbps are reduced by the above signal processing to approximately 167 Mbps, which is further reduced by frequency conversion, sub-sampling and sub-lining into 84 Mbps. These data are compression-encoded by the block-forming and encoding circuit 8 and thereby reduced to approximately 25 Mbps. Subsidiary data such as parity and audio signals are subsequently annexed to the compressed data so that the recording data volume becomes 31.56 Mbps.

Figure 18:
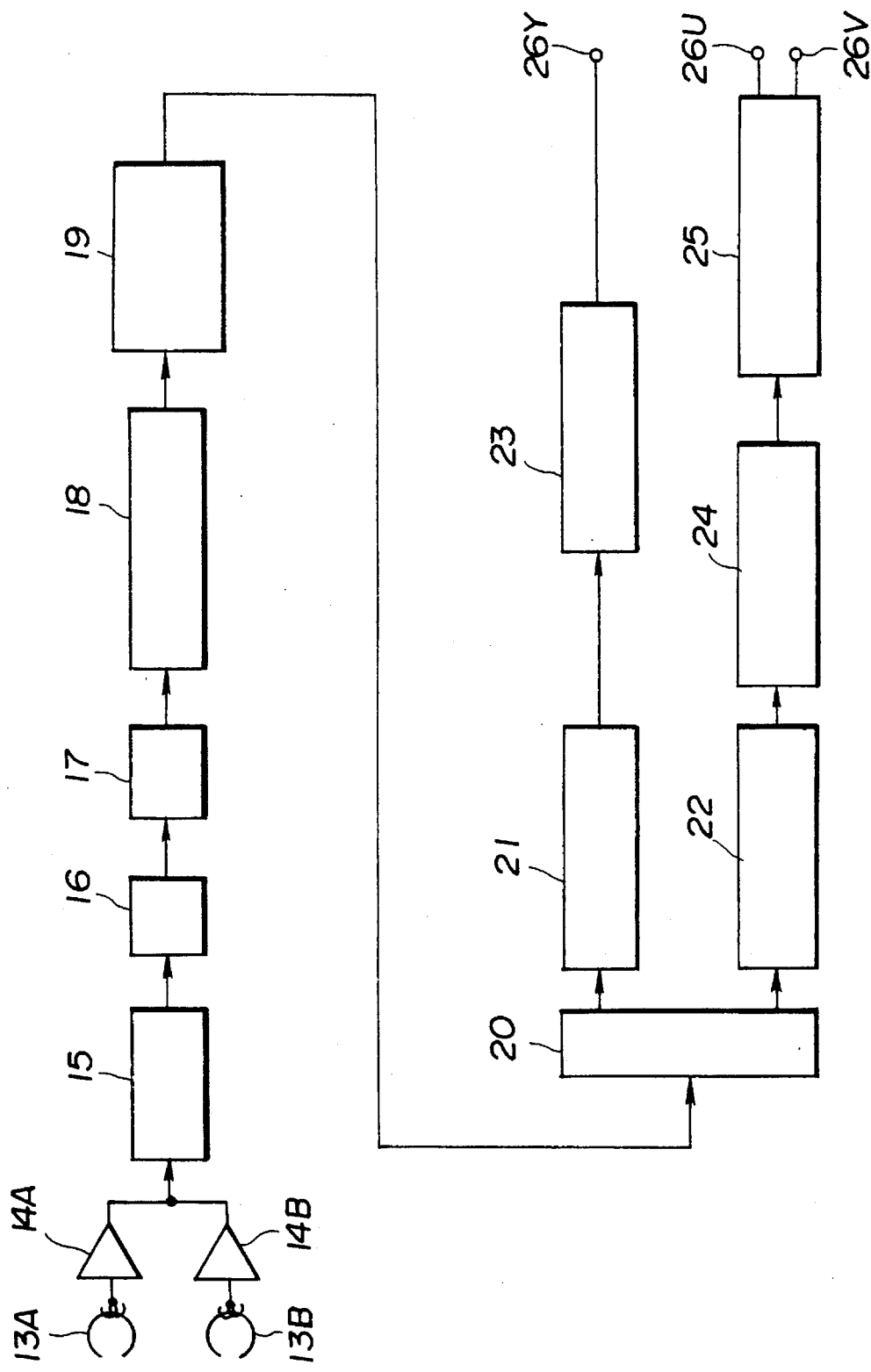
FIG. 18 is a block diagram showing an arrangement of a playback side of the signal processor.

The arrangement of a playback side is explained by referring to FIG. 18.

For playback, playback data from magnetic heads 13A, 13B are supplied via rotary transformer and playback amplifiers 14A, 14B to a channel decoder 15 in which a demodulation which is the reverse of the channel encoding is carried out. An output signal of channel decoder 15 is supplied to a time base correcting circuit (TBC circuit) 16 in which the playback signals are freed of jitter components. Playback data from TBC circuit 16 are supplied to an ECC circuit 17 where error concealment and error correction are carried out using error correction code data. An output signal of the ECC circuit 17 is supplied to a de-framing (frame decomposition) circuit 18.

In the frame decomposition circuit 18, the respective components of the encoded block data are separated from one another, while switching from the clocks of the recording system to clocks of the pixel system is carried out. The separated data from the frame decomposition circuit 18 are supplied to a block decoding circuit 19, where decoded data corresponding to original data are decoded on the block-by-block basis and the decoded data is supplied to a distribution circuit 20. The decoded data is separated by the distribution circuit 20 into luminance signals and color difference signals which are supplied to block decomposition circuits 21, 22, respectively. The block decomposition circuits 21, 22 perform the operation which is the reverse of the operation performed by the transmitting side block-forming circuits 5 and 6, that is, convert the decoded data in the block sequence into decoded data in the raster scanning sequence.

On the other hand, the digital color difference signals from the block decomposition circuit 22 are supplied to distribution circuit 24 where the line-sequential digital color difference signals U and V are separated into digital color difference signals U and V, respectively. These color difference signals U V are supplied to an interpolating circuit 25 and thereby interpolated. The interpolating circuit 25 interpolates the data of the pixels and lines eliminated by sub-sampling, using the restored pixel data. The digital color difference signals U and V, having a sampling rate of 2 fs, are produced by the interpolating circuit 25 so as to be outputted at output terminals 26U, 26V, respectively.

b. Block-Forming and Encoding

As the block-forming and encoding circuit 8, shown in FIG. 17, an adaptive dynamic range coding (ADRC) encoder is employed. With the ADRC encoder, a maximum value MAX and a minimum value MIN of plural pixel data contained in each block are detected, a dynamic range DR of each block is detected from the detected maximum and minimum values MAX, MIN, and encoding adapted to the dynamic range DR is carried out to achieve re-quantization using the number of bits smaller than that of the original pixel data. As another example of the block-forming and encoding circuit 8, it is also possible to discrete cosine transform the pixel data of each block, quantize the coefficient data resulting from DCT and to encode the quantized data by run-length Huffman encoding by way of compression coding.

An example of an ADRC encoder in which deterioration in the picture quality is unlikely to be caused on dubbing a number of times is hereinafter explained by referring to FIG. 21.

Figure 21:
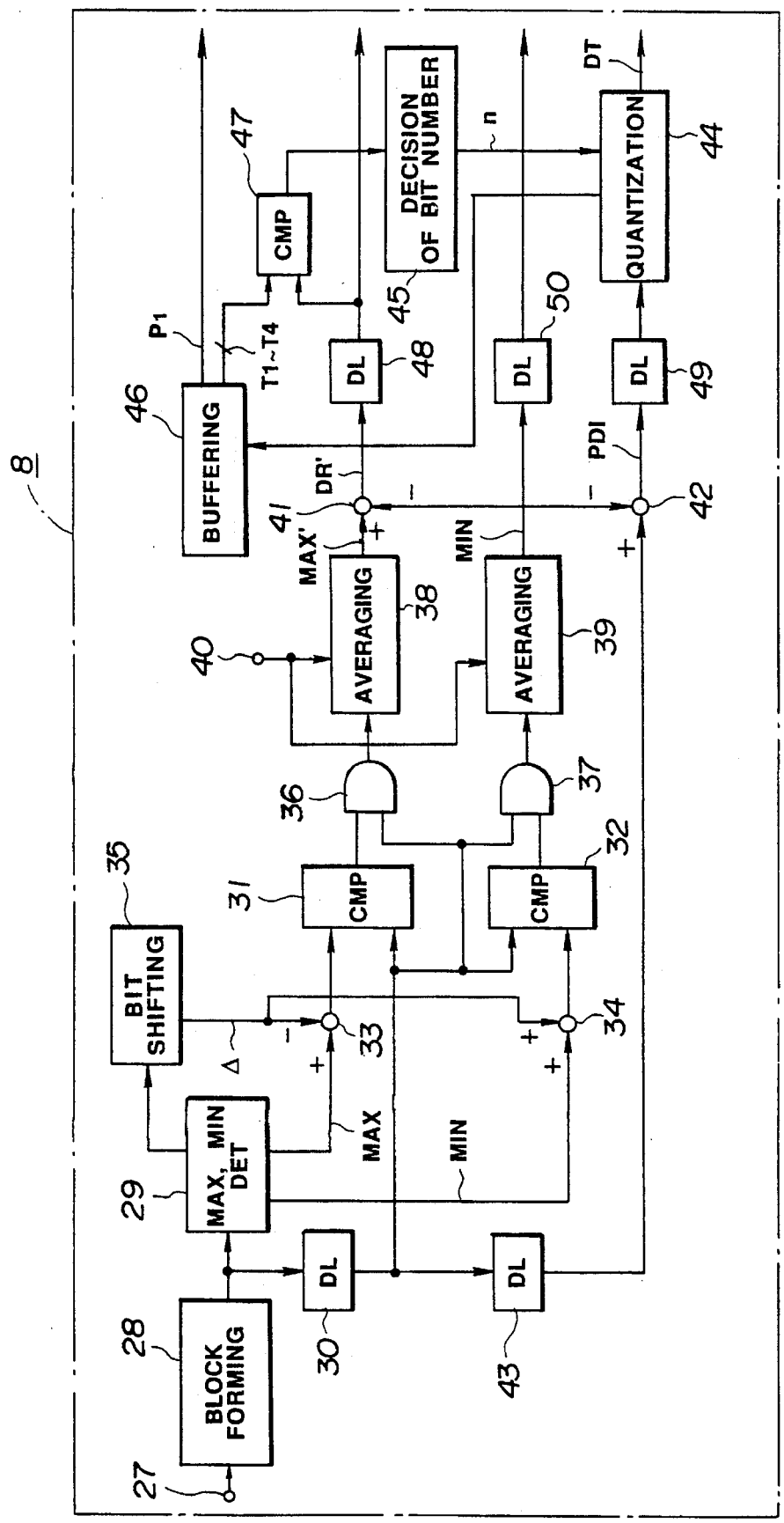
FIG. 21 is a block circuit diagram showing an example of a block encoding circuit.

Referring to FIG. 21, digital video signals or digital color difference signals, quantized at a rate of 8 bits per sample, are supplied from a synthesis circuit 7 of FIG. 17 to an input terminal 27. The block data from input terminal 27 are supplied to a maximum value and minimum value detection circuit 29 and a delay circuit 30. The maximum value and minimum value detection circuit 29 detects a minimum value MIN and a maximum value MAX from block to block. The delay circuit 30 delays input data a time necessary for detecting the maximum and minimum values. Pixel data from delay circuit 30 are supplied to comparators 31, 32.

The maximum value MAX and the minimum value MIN from the maximum value and minimum value detection circuit 29 are supplied to a subtraction circuit 33 and an addition circuit 34, respectively. The subtraction circuit 33 and the addition circuit 34 are supplied from a bit-shifting circuit 35 with a value of a quantization step width ($\Delta = 1/16$ DR) in case of non-edge matching encoding with a fixed 4-bit length. The bit-shifting circuit 35 is designed to shift the dynamic range DR by four bits to carry out a division of $1/16$. A threshold value of (MAX−Δ) is obtained from subtraction circuit 33, while a threshold value of (MAX+Δ) is obtained from addition circuit 34. These threshold values from the subtraction circuit 33 and the addition circuit 34 are supplied to comparators 31, 32, respectively. Meanwhile, the value Δ defining the threshold values may also be a fixed value corresponding to a noise level, instead of being a quantization step width.

An output signal from comparator 31 is supplied to an AND gate 36, while an output signal from comparator 32 is supplied to an AND gate 37. The AND gates 36, 37 are also supplied with input data from delay circuit 30. The output signal of the comparator 31 goes high when the input data is larger than the threshold value, so that pixel data of the input data comprised within a maximum range of (MIN~MIN−Δ) is extracted at output terminal of AND gate 36. On the other hands, the output signal of the comparator 32 goes high when the input data is smaller than the threshold value, so that pixel data of the input data comprised within a minimum range of (MIN~MIN+Δ) is extracted at output terminal of AND gate 37.

An output signal of AND gate 36 is supplied to an averaging circuit 38, while an output signal of AND gate 37 is supplied to an averaging circuit 39. These averaging circuits 36, 37 each compute a mean value from block to block and are supplied with a reset signal of a period signal to a block period from terminal 40. A mean value MAX' of the pixel data comprised within a maximum level range of (MAX~MAX−Δ) is obtained from averaging circuit 38, while a mean value MIN' of the pixel data comprised within a minimum level range of (MIN~MIN+Δ) is obtained from averaging circuit 39. The mean value MIN' is subtracted by subtraction circuit 41 from the mean value MAX' so that a dynamic range DR' is obtained by the subtraction circuit 41.

The mean value MIN' is supplied to a subtraction circuit 42 so as to be subtracted from the input data transmitted via delay circuit 43 to produce data PDI freed of the minimum value. The data PDI and the concealed dynamic range DR' are supplied to a quantization circuit 44. In the present embodiment a variable length ADRC is employed in which the numbers of bits allocated to quantization are set to one of 0 (not transmitting code data), 1, 2, 3 or 4, and edge matching quantization is carried out. The number of bit allocation n is set by a bit number decision circuit 45 from block to block, and data of a bit number n is transmitted to quantization circuit 44.

It is possible with variable length ADRC to achieve high efficiency encoding by allocating a smaller number of bits for blocks having a small dynamic range DR' and by allocating a larger number of bits to a block having a larger dynamic range DR'. That is, if the threshold value for deciding the number of bits n is set to T1~T4 (T1<T2<T3<T4), no code signal is transmitted for the block (DR'<T1) and only data of the dynamic range DR' is transmitted. For blocks of (T1<DR'<T2), (T2<DR'<T3), (T3<DR'<T4) and (DR'>T4), the numbers of bits n are (n=1), (n=2), (n=3) and (n=4), respectively.

With the above-described variable length ADRC, the amount of the generated information may be controlled by changing the threshold values T1 to T4, by way of so-called buffering. For this reason, the variable length ADRC may be applied to a transmission channel, such as a video tape recorder of the present invention, in which the amount of the information generated per field or frame needs to be of a predetermined value.

A plurality of, e.g. 32, sets of the threshold values (T1, T2, T3 and T4) are stored in the buffering circuit 46 which is adapted for deciding the threshold values T1 to T4 employed for setting the amount of the generated information to a predetermined value. These sets of the threshold values are distinguished by parametric codes Pi (i=0, 1, 2, ... 31). The numbers i of the parametric codes Pi are set so that the larger the number i, the more pronounced is the tendency for the amount of the generated information to be decreased monotonously. However, the restored picture is degraded in picture quality with decrease in the amount of the generated information.

The threshold values T1 to T4 are supplied from buffering circuit 46 to a comparator 47, while the dynamic range DR' via delay circuit 48 is supplied to comparator 47. The delay circuit 48 delays the dynamic range DR' by a time necessary for the set of the threshold values to be determined by the buffering circuit 46. The comparator 47 compares the dynamic range DR' of the block with the respective threshold values and outputs a comparison output to a bit number decision circuit 45 where the number of bit allocation n for the block is set.

In the quantization circuit 44, the data PDI from delay circuit 49, freed of the minimum value data, is converted into code signals DT by edge matching quantization, using the dynamic range DR' and the number of bit allocation n. The quantization circuit 44 is constituted by e.g. a ROM.

The concealed dynamic range data DR' and the mean value MIN' are outputted via delay circuits 48, 50, respectively. In addition, the parametric code Pi indicating a set of threshold values and code signal DT is also outputted. In the present embodiment deterioration in picture quality on dubbing is minimized because signals once quantized by non-edge matching quantization is quantized by edge matching quantization based on the dynamic range information.

c. Channel Encoder and Channel Decoder

The channel encoder 11 and the channel decoder 15 shown in FIG. 17 are hereinafter explained.

Figure 22:
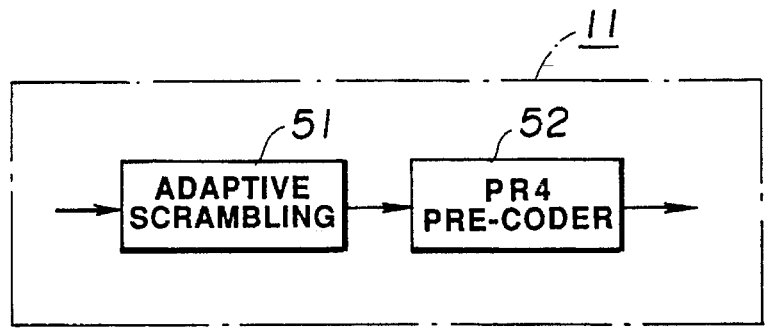
FIG. 22 is a block diagram showing an example of a channel encoder.

In the channel error 11, as shown in FIG. 22, plural adaptive M-series scrambling circuits 51 are provided in an adaptive scrambling circuit supplied with an output of the parity generating circuit 10, and such an M-series is selected for which an output with the minimum content in the high frequency components and in the dc components are obtained for the input signals. A processing of $1/1-D^2$, D being a unit delaying circuit, is carried out in a pre-coder 52 for a partial response class 4 detection system. An output of the pre-coder 52 is recorded and reproduced by magnetic heads 13A, 13B via recording amplifiers 13A, 13B and the resulting playback output is amplified by playback amplifiers 14A, 14B.

Figure 23:
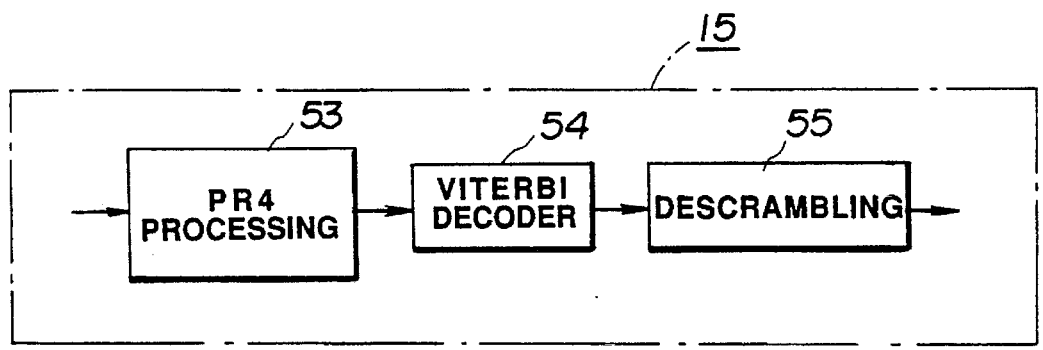
FIG. 23 is a block diagram showing an example of a channel decoder.

In the channel decoder 15, as shown in FIG. 23, a processing of 1+D is performed on an output of the playback amplifiers 14A, 14B by a partial response class 4 playback processing circuit 53. At a so-called bit-by-bit decoding circuit 54, decoding of data strong against noise is carried out on an output of the processing circuit 53 by processing using data correlation and plausibility processing. An output of the bit-by-bit decoding circuit 54 is supplied to a descrambling circuit 55 whereby the data re-arrayed by scrambling at the recording side is restored to the original array for restoring the original data. With the bit-by-bit decoding circuit 54, playback C/N conversion is improved by 3 dB as compared to the case in which bit-by-bit decoding is to be performed.

d. Running System

Figure 24:
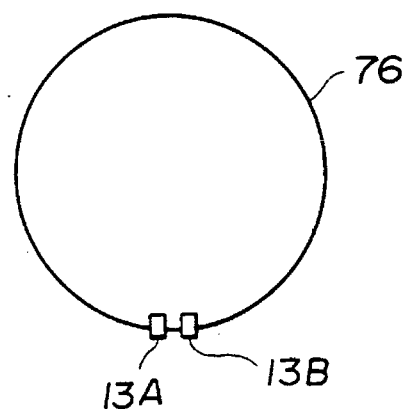
FIG. 24 is a schematic plan view showing a typical arrangement of a rotary drum.

The magnetic heads 13A and 13B are attached to a drum 76 as a unified structure to a drum 76, as shown in FIG. 24.

A magnetic tape, not shown, is wrapped at a wrapping angle slightly larger or smaller than 180° on the peripheral surface of the drum 76, so that the magnetic tape is scanned by the magnetic heads 13A and 13B simultaneously.

The magnetic gaps of the magnetic heads 13A and 13B are set so as to be inclined in opposite directions, that is, in such a manner that the magnetic head 13A and the magnetic head 13B are inclined by +20° and by −20° relative to the track width direction, respectively. This minimizes the amount of cross-talk between adjacent tracks caused by so-called azimuth losses during playback.

Figure 25:
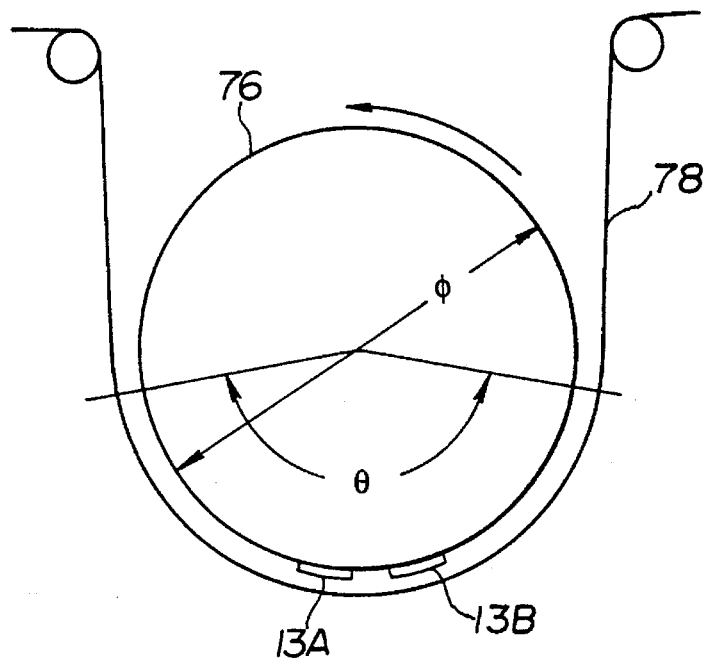
FIG. 25 is a plan view showing a typical construction of the rotary drum and the wrapping state of a magnetic tape.
Figure 26:
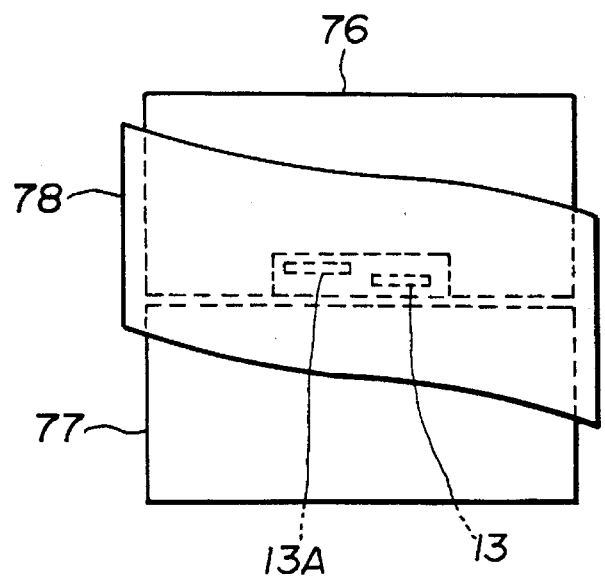
FIG. 26 is a front view showing a typical construction of the rotary drum and the wrapping state of a magnetic tape.

FIGS. 25 and 26 show a more concrete unitary structure of the magnetic heads 13A, 13B in the form of a so-called double-azimuth head. For example, unitary magnetic heads 13A, 13B are mounted on an upper drum 76 rotated at an elevated velocity, with a lower drum 77 remaining stationary. The wrapping angle θ of a magnetic tape 78 is 166°, while the drum diameter φ is 16.5 mm.

Consequently, one-field data are recorded in five tracks. By this segment system, track length may be reduced for reducing errors caused by linear characteristics of the tracks.

By simultaneous recording by the double-azimuth magnetic heads, it becomes possible to reduce errors caused by linearity as compared to the case in which a pair of magnetic heads are placed at a diametrically opposite positions on the drum. On the other hand, bearing adjustment may be made more accurately because of a limited distance between the heads. Consequently, recording/playback may be achieved with a track of a narrower width.

What is claimed is:

1. A magnetic recording medium comprising:

a base film having first and second opposed surfaces, said first surface having a centerline mean roughness, $R_a$, of greater than or equal to 0.0015 µm and less than equal to 0.0070 µm and having a maximum protrusion height $R_{max}$ of greater than or equal to 0.0015 µm and less than or equal to 0.070 µm;

a magnetic metal thin film layer disposed on said second surface of the base film;

an oxide layer having a thickness of from about 20 to about 230 Å disposed on said magnetic metal thin film;

a protective layer having a thickness of from about 20 to about 230 Å disposed on said oxide layer, the combined total thickness of said oxide layer and said protective layer being from about 40 to 250 Å; and a lubricant layer disposed on said protective layer, said lubricant layer including a perfluoro polyether derivative formed by reaction of a carboxy-terminated perfluoro polyether with a hydrocarbon substituted quaternary ammonium compound and selected from derivatives having the formula:

(1)

wherein Rf represents a perfluoro polyether chain, $R^1$, $R^2$, $R^3$ represent hydrogen or a hydrocarbon residue and $R^4$ is a hydrocarbon residue having six or more carbon atoms, and

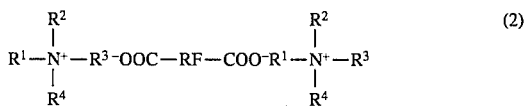

(2)

wherein Rf is a perfluoro polyether chain, $R^1$, $R^2$ and $R^3$ are each hydrogen or a hydrocarbon residue and $R^4$ is a hydrocarbon residue having six or more carbon atoms.

2. A magnetic recording medium as defined in claim 1, wherein said base film is selected from the group consisting of polyesters, aromatic polyamides and polyimides.

3. A magnetic recording medium as defined in claim 1, wherein the magnetic metal film layer is a magnetic metal material selected from the group consisting of Fe, Co, Ni, Fe—Co, Co—Ni, Fe—Co—Ni, Fe—Co—Cr, Co—Ni—Cr and Fe—Co—Ni—Cr.

4. A magnetic recording medium as defined in claim 1, wherein said protective layer is a film selected from the group consisting of carbon, $SiO_2$, $Si_3N_4$, SiN, BN, $ZnO_2$, $Al_2O_3$, $MoS_2$ and SiC.

5. A magnetic recording medium as defined in claim 1, wherein in said perfluoro polyether derivative $R^4$ is a hydrocarbon residue having 10 or more carbon atoms.

6. A magnetic recording medium as defined in claim 1, wherein in said perfluoro polyether derivative $R^4$ is $C_{18}H_{37}$.

7. A magnetic recording medium as defined in claim 1, wherein said magnetic metal thin film layer is a single layer.

8. A magnetic recording medium as defined in claim 1, wherein said magnetic metallic thin film layer is of a multi-layer construction including at least two layers of stacked magnetic thin film having a non-metallic intermediate layer interposed therebetween.

9. A magnetic recording medium as defined in claim 1, wherein in the perfluoro polyether derivative, each polar group moiety represented by the formula

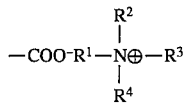

has a molecular weight of less than or equal to 20.

10. A magnetic recording medium as defined in claim 8, wherein said non-metallic intermediate layer is an oxide of a metal selected from the group consisting of Cr, Si, Al, Mn, Bi, Ti, Sn, Pb, In, Zn, Cu and mixtures of any of the foregoing.

11. A method for making a magnetic recording medium comprising:

providing a base film having first and second opposed surfaces, said first surface having a centerline mean roughness, $R_a$, of greater than or equal to 0.0015 µm and less than or equal to 0.0070 µm and having a maximum protrusion height $R_{max}$ of greater than or equal to 0.0015 µm and less than or equal to 0.070 µm;

forming a magnetic metal thin film on the second surface of the base film in a vacuum chamber by a vacuum deposition method to define a magnetic metal film layer on said base film having an exposed surface;

oxidizing the exposed surface of the magnetic metal film layer to define an oxide layer thereon;

etching said oxide layer to remove at least a portion of the thickness of the oxide layer by passing the base film between a pair of electrodes delivering a power density of at least about 1.6 kW/m² and bombarding the oxide layer with an inert gas to provide an etched oxide layer having a thickness of from about 20 to about 230 Å; and thereafter, forming a protective layer having a thickness of from about 20 to 230 Å on said etched oxide layer within the same vacuum chamber, the combined total thickness of said etched oxide layers and said protective layers being from about 40 to about 250 Å.

12. A method as defined in claim 11, wherein the inert gas is Argon gas.

13. A method as defined in claim 11, wherein etching is performed by bombardment with a mixture of an inert gas and a reducing gas introduced into the inert gas, said reducing gas being selected from the group consisting of hydrogen and acetylene.

* * * * *